(12) United States Patent
Kunimine et al.

(10) Patent No.: US 8,356,871 B2
(45) Date of Patent: Jan. 22, 2013

(54) INKJET PRINTER, INKJET PRINTING METHOD AND PROGRAM

(75) Inventors: Noboru Kunimine, Tokyo (JP); Rie Takekoshi, Kawasaki (JP); Takumi Kaneko, Tokyo (JP); Takao Ogata, Tokyo (JP); Kazuki Narumi, Kawasaki (JP); Yumi Kamimura, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 333 days.

(21) Appl. No.: 12/818,627

(22) Filed: Jun. 18, 2010

(65) Prior Publication Data

US 2010/0328389 A1 Dec. 30, 2010

(30) Foreign Application Priority Data

Jun. 24, 2009 (JP) ................. 2009-150073

(51) Int. Cl.
*B41J 29/38* (2006.01)
*B41J 29/393* (2006.01)
*B41J 2/015* (2006.01)
(52) U.S. Cl. ............... 347/14; 347/12; 347/19; 347/21
(58) Field of Classification Search .............. 347/14, 347/12, 19, 21
See application file for complete search history.

(56) References Cited

U.S. PATENT DOCUMENTS

| 5,338,597 | A | | 8/1994 | Kurabayashi et al. | |
| 6,145,978 | A | * | 11/2000 | Kato et al. | 347/101 |
| 6,709,082 | B2 | | 3/2004 | Kaneko | |
| 6,896,348 | B2 | | 5/2005 | Takekoshi et al. | |
| 7,270,390 | B2 | | 9/2007 | Baba et al. | |
| 7,497,540 | B2 | * | 3/2009 | Mizutani et al. | 347/15 |
| 8,091,975 | B2 | * | 1/2012 | Kaneko et al. | 347/14 |
| 8,132,878 | B2 | * | 3/2012 | Takekoshi et al. | 347/12 |
| 8,197,050 | B2 | * | 6/2012 | Takekoshi et al. | 347/98 |
| 2006/0214970 | A1 | * | 9/2006 | Hirakawa | 347/15 |

FOREIGN PATENT DOCUMENTS

| JP | 2000-153677 A | 6/2000 |
| JP | 2003-170650 A | 6/2003 |
| JP | 2004-001446 A | 1/2004 |

\* cited by examiner

*Primary Examiner* — Laura Martin
*Assistant Examiner* — Jeremy Bishop
(74) *Attorney, Agent, or Firm* — Fitzpatrick, Cella, Harper & Scinto

(57) ABSTRACT

An inkjet printing apparatus includes a print head that scans a same area of a printing medium plural times and ejects plural kinds of ink and a treatment liquid thereon to form an image, and an ejection data generating unit for generating ejection data for ejecting the plural kinds of ink and the treatment liquid to each predetermined area of the printing medium in a predetermined order from the print head. The plural kinds of ink are classified in plurality based upon a minimum application amount of the treatment liquid per a predetermined area required for realizing an effect of the treatment liquid, and the ejection data generating unit generates the ejection data in such a manner as to eject the plural kinds of ink and the treatment liquid from the print head according to the order determined in accordance with the classification of the ink ejected within the predetermined area.

17 Claims, 16 Drawing Sheets

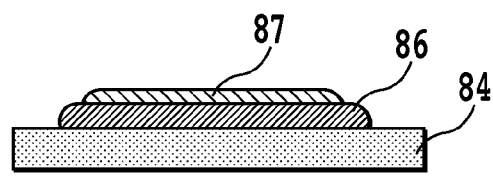
FIG.9A
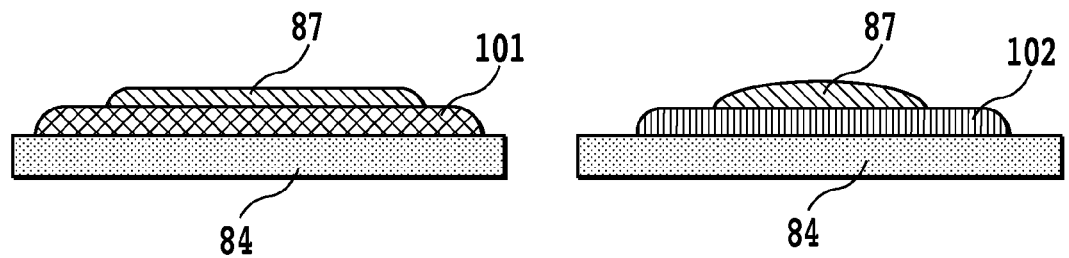
FIG.9B     FIG.9C

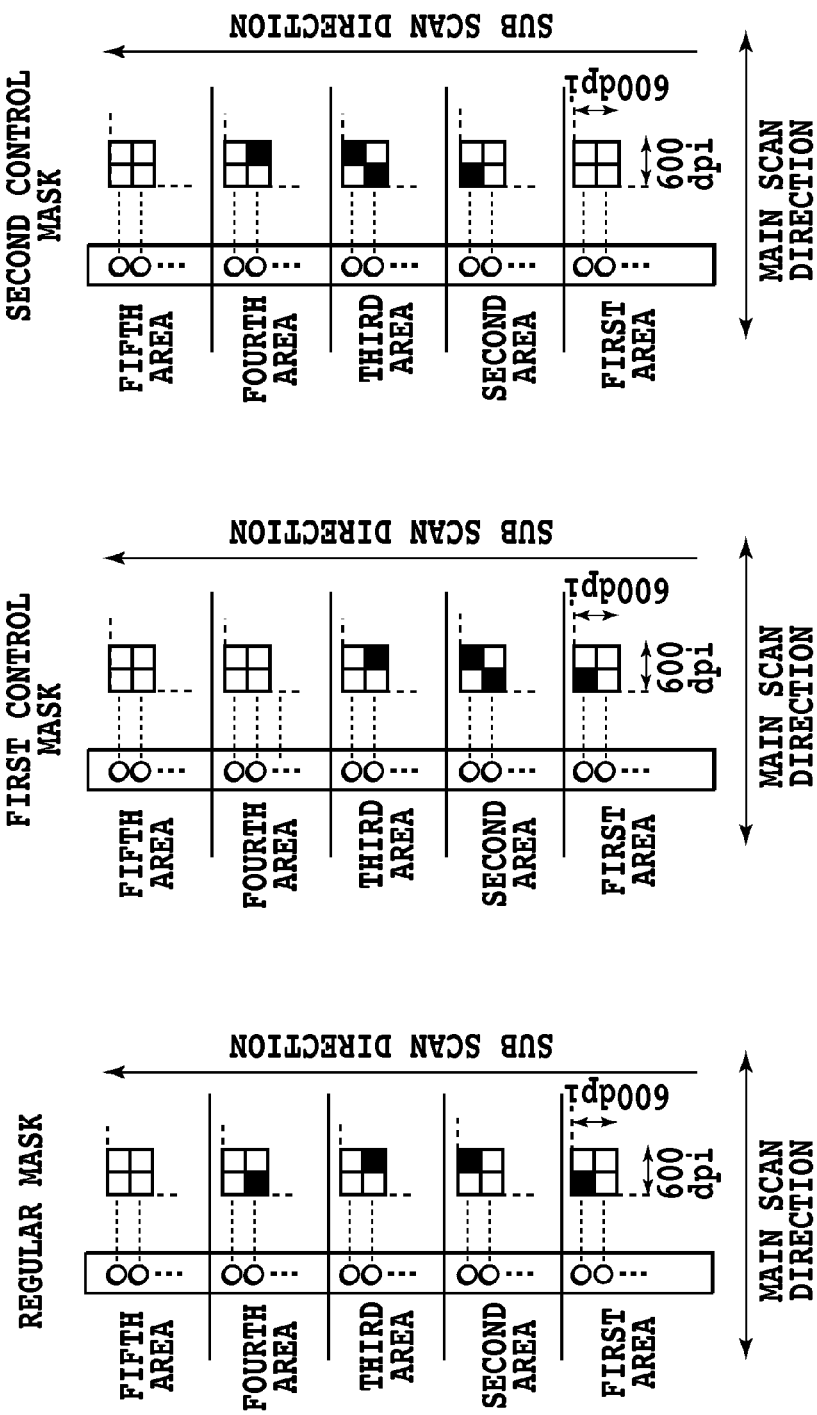

INKJET PRINTER, INKJET PRINTING METHOD AND PROGRAM

BACKGROUND OF THE INVENTION

1. Field of the Invention

The present invention relates to an inkjet printing apparatus and an inkjet printing method which perform an image print by ejecting plural kinds of ink and a treatment liquid.

2. Description of the Related Art

In recent years, an inkjet printing apparatus has widely been used for a public exhibition application or trademark print application such as photographs, posters and graphic prints followed by high-definition processing of an image to be printed. As for image characteristics required in an image formed for such a public exhibition application or trademark print application, there is an increasing requirement in regard to an improvement on image quality such as high-definition processing, uniformity of gloss, and reduction in bronze properties or an improvement on image robustness such as strength or long-term preservation of an image. Here, the bronze properties mean a degree of reflecting a color different from a color of illumination light due to a bronze phenomenon at the time the illumination light is regularly reflected (mirror-reflected) on a pigment image surface, and it is well known that the bronze properties remarkably occur in cyan ink. In addition, the strength of the image means a scratch resistance (rub-fastness) of an image at the contacting between a friction object and an image surface in the handling process such as an attachment operation of a printed object or a solution resistance of an image at the contacting with solution such as rain or water. The long-term preservation means a fading resistance of an image to an active gas (oxygen or the like) in air or sunlight at the time of preserving a printed object in a room or the like for a long time.

Coloring ink used in the inkjet printing apparatus is categorized roughly into a dye group and a pigment group. Since the dye group and the pigment group differ in an existing state of a color material in the solution from each other, the image quality and the image robustness mentioned above are quite different between them. Since in the dye group ink, coloring dye is dissolved at a molecular state in water or an alcoholic medium, the dye group ink has higher transparency and is more excellent in coloring than the pigment group ink, but lower in image robustness such as a solution resistance or a fading resistance to long-term preservation. It is general that since in the pigment group ink, color material pigment is dispersed in a particulate state in the solvent, the pigment group ink is more excellent in a fading resistance to ultraviolet rays or active gases in air, but in reverse, is poorer in image quality such as coloring properties as compared to the dye group ink.

For overcoming these problems, various types of additional technologies are proposed. For example, there is proposed a transfer laminate film process of covering an image with a transparent plastic layer by a transfer film (refer to Japanese Patent Laid-Open No. 2000-153677). In addition, there is proposed a treatment process of covering a surface of an image with a transparent treatment liquid containing a resin or the like, or applying the transparent treatment liquid to the surface of the image (refer to Japanese Patent Laid-Open No. 2004-001446). Further, there is proposed a post-treatment process in which a printing medium having an ink acceptable layer containing thermoplastic particles is used and the printing medium is heated after performing a print thereon to bond a pigment layer and the ink acceptable layer (refer to Japanese Patent Laid-Open No. 2003-170650).

As in the case of the conventional technologies mentioned above, the process of covering the surface of the image with the plastic layer formed of the transfer film after forming the image or the process of partially or completely covering the outermost surface of the image with the transparent treatment liquid is remarkably effective for improving the image strength or the image quality. However, since in the conventional technology, the treatment liquid is applied to a large part of the image to be printed, it leads to consumption of a great deal of the treatment liquids as compared to an ink consumption amount of each color. Therefore, there occurs a problem of an increase in size of an ink tank for treatment liquid or an increase in running cost due to consumption of a great deal of the treatment liquids.

SUMMARY OF THE INVENTION

The present invention is made in view of these problems, and an object of the present invention is to provide an inkjet printing apparatus and an inkjet printing method which can restrict a consumption amount of a treatment liquid without extremely degrading image characteristics such as image quality or image robustness.

For achieving the above object, an inkjet printing apparatus according to the present invention in which a print head scans the same area of a printing medium by plural times and ejects plural kinds of ink and a treatment liquid to form an image comprises an ejection data generating unit for generating ejection data for ejecting the plural kinds of the ink and the treatment liquid to each predetermined area of the printing medium in a predetermined order from the print head, wherein the plural kinds of the ink is classified in plurality based upon a minimum application amount of the treatment liquid per a predetermined area required for realizing an effect of the treatment liquid, and the ejection data generating unit generates the ejection data in such a manner as to eject the plural kinds of the ink and the treatment liquid from the print head according to the order determined in accordance with the classification of the ink ejected within the predetermined area.

According to the present invention, the consumption amount of the treatment liquid can be restricted without extremely degrading image characteristics such as image quality or image robustness.

Further features of the present invention will become apparent from the following description of exemplary embodiments (with reference to the attached drawings).

BRIEF DESCRIPTION OF THE DRAWINGS

FIG. 9A is a pattern diagram showing a fixing state where a surface of the pigment ink dot firmly fixed on the glossy paper is coated with a transparent plastic layer;

FIG. 9B is a pattern diagram showing a layer structure at the time of forming a transparent plastic layer on a surface of first pigment ink 101 by a treatment liquid;

FIG. 9C is a pattern diagram showing a layer structure at the time of forming a transparent plastic layer on a surface of second pigment ink 102 by a treatment liquid;

FIGS. 16A to 16C are pattern diagrams showing mask patterns in the second embodiment of the present invention.

DESCRIPTION OF THE EMBODIMENTS

Hereinafter, embodiments of an inkjet printing apparatus (hereinafter, simply called also a printer) to which the present invention is applicable will be explained with reference to the accompanying drawings.

1. First Embodiment (Appearance Configuration)

Figure 1:
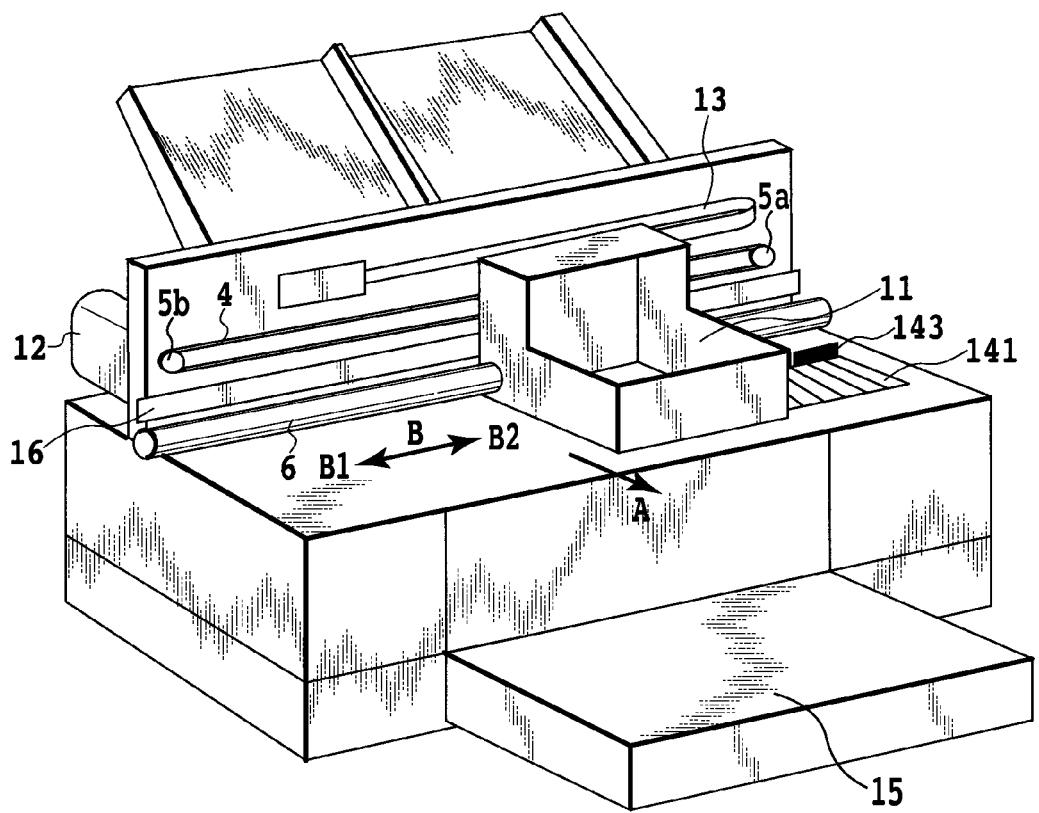
FIG. 1 is an appearance perspective view showing an inkjet printing apparatus according to an embodiment of the present invention.

FIG. 1 is an appearance perspective view showing an inkjet printing apparatus according to an embodiment of the present invention. As shown in FIG. 1, this printer is provided with a carriage 11 mounting detachably a head cartridge thereon equipped with print heads and ink tanks reserving ink integrally formed. In addition, a carriage motor 12 as a drive source for reciprocating the carriage 11 (in a main scan direction) is provided in the printer. A drive force of the carriage motor 12 is transmitted to a belt 4 which is wound around between pulleys 5a and 5b and connected to the carriage 11. The belt 4 moves in a forward direction and in a backward direction followed by a forward rotation and a backward rotation of the carriage motor 12, so that the carriage 11 moves in an outward direction and in a return direction along a guide shaft 6. Followed by the movement of the carriage 11, a pulse signal is outputted from an encoder sensor 16 configured by an optical sensor, and a control unit to be described later detects a position of the carriage 11 based upon the pulse signal. Further, the printer is provided with a flexible cable 13 for transferring an electrical signal from the control unit (to be described later) to the print heads, caps and a wiper blade 143 used for executing restoration processing of the print heads, a cassette 15 storing printing mediums therein, and the like.

Here, the print heads and the ink tanks are integrally formed, but may be separately configured.

(Mechanism Unit and Print Head)

Figure 2:
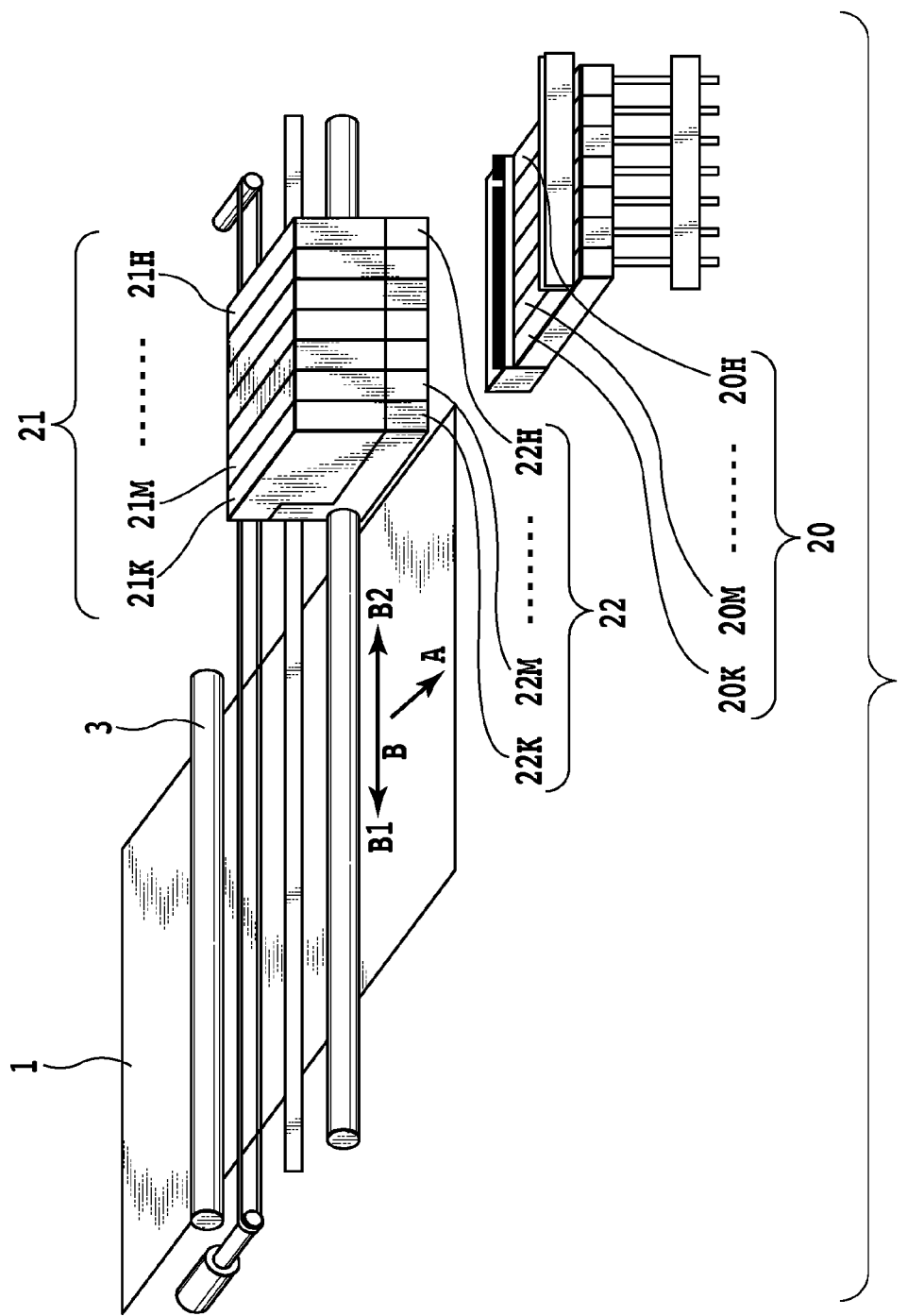
FIG. 2 is a perspective view showing a main part of the inkjet printing apparatus shown in FIG. 1.

FIG. 2 is a perspective view showing a main part of a mechanism unit in the printer of FIG. 1. Print heads 22 include print heads for color ink and a print head for a treatment liquid, and the ink or the treatment liquid is ejected from an ejection opening provided in each of these print heads to a printing medium 1 to perform a print. "Treatment liquid" in the present specification means a liquid improving image performance such as image robustness or image quality (image characteristic-improving liquid). In addition, "improvement on image robustness" means to improve robustness of an image by improving at least one of a scratch resistance, a weather resistance, a water resistance, and an alkali resistance. In addition, "improvement on image quality" means to improve quality of an image by improving at least one of coloring properties, glossy properties, haze properties and bronze properties.

The print heads 22 comprise seven print heads respectively for ejecting color ink of black (22K), cyan (22C), magenta (22M), yellow (22Y), light cyan (22LC) and light magenta (22LM) and a treatment liquid (22H). Ink tanks 21 comprise seven ink tanks 21K, 21C, 21M, 21Y, 21LC, 21LM and 21H for storing ink of each color of the print heads 22 and the treatment liquid, to supply the ink of the corresponding colors and the treatment liquid to the corresponding print heads. The print heads 22 and the ink tanks 21 mounted on the carriage 11 are movable in a main scan direction (arrow B direction) together with the carriage 11.

Caps 20 comprise seven caps 20K, 20C, 20M, 20Y, 20LC, 20LM and 20H for capping respective ink ejection faces of the seven print heads. The print heads 22 and the ink tanks 21 return back to a home position where the caps 20 exist together with the carriage 11 and stand therein by during a period of not performing a print operation. It should be noted that at the time of referring to these print heads and the ink tanks individually, a reference number attached to each of the print heads and the ink tanks is used, and at the time of referring to these print heads and the ink tanks collectively, numeral 22 is used for the print heads, numeral 21 is used for the ink tanks and numeral 20 is used for the caps as collective reference numbers.

Figure 3:
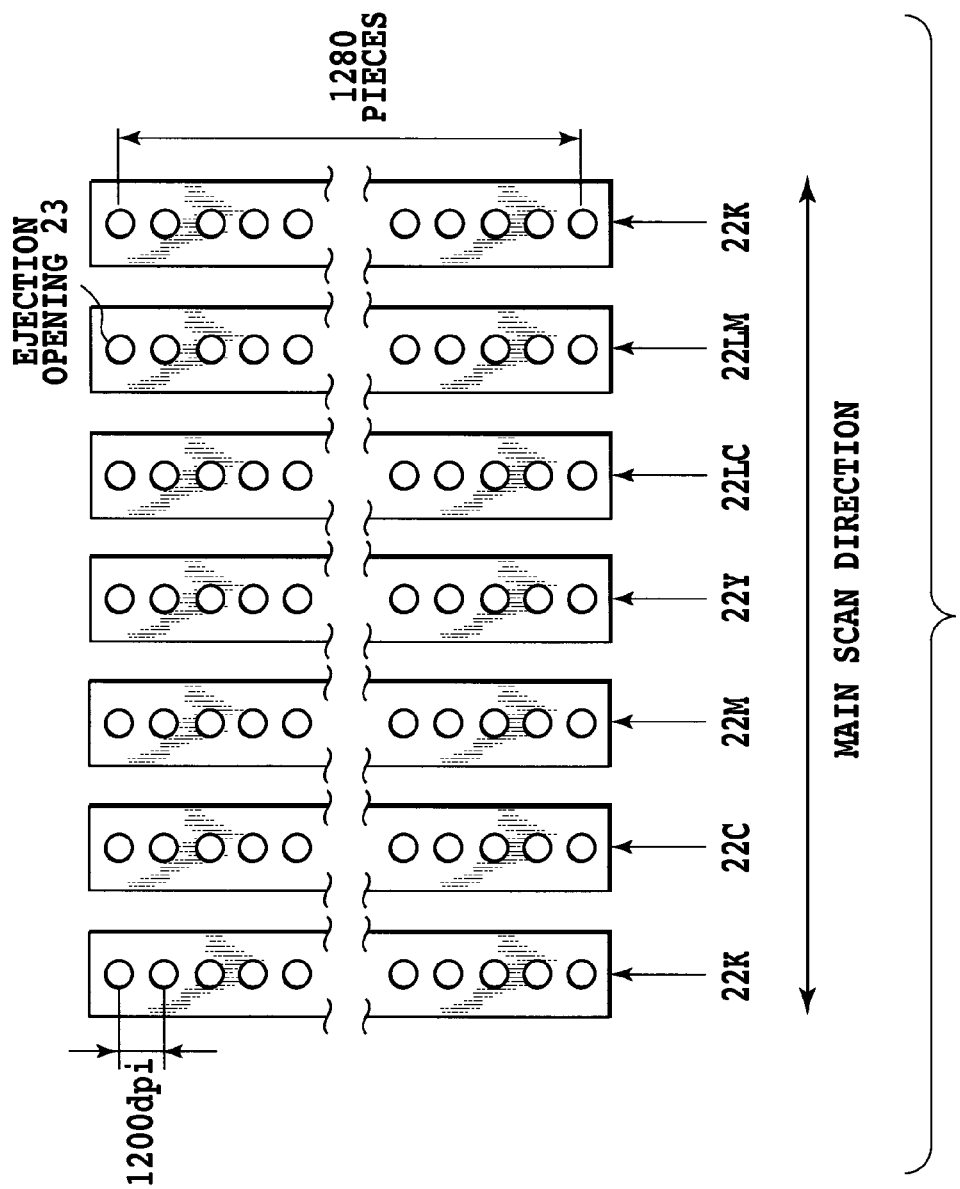
FIG. 3 is a diagram showing a print head as viewed from an ejection opening side.

FIG. 3 is a diagram showing the print head 22 as viewed from an ejection opening side thereof. Each of the print heads 22 is provided with 1280 pieces of ejection openings 23 formed in a row by an interval corresponding to print density of 1200 dpi. These seven print heads 22 are arranged to line up in a main scan direction to form an ejection opening array of each color. An ejection amount of ink ejected from each ejection opening 23 is approximately 4 ng.

(Control System)

Figure 4:
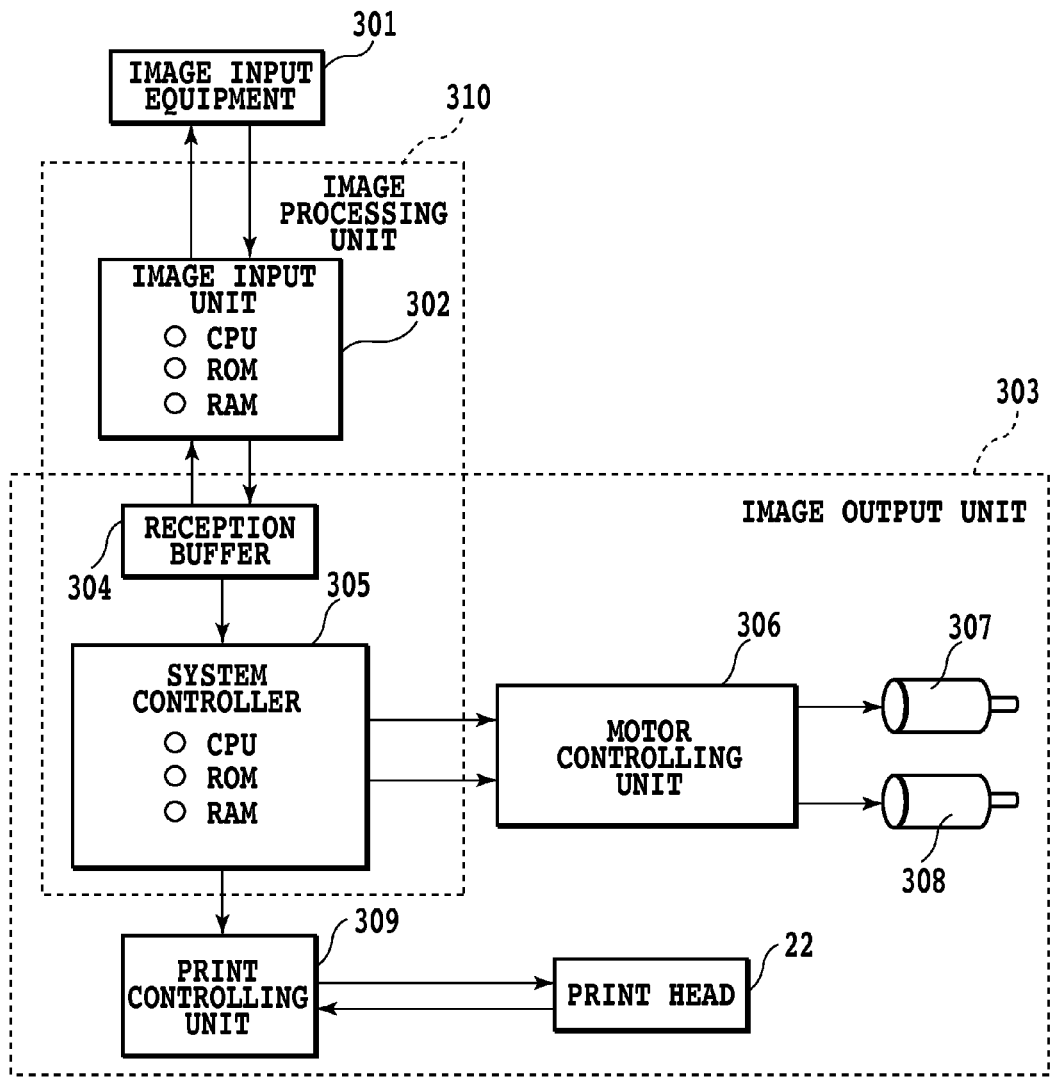
FIG. 4 is a block diagram explaining the configuration of a control system in the inkjet printing apparatus.

FIG. 4 is a block diagram explaining the configuration of a control system in the inkjet printing apparatus shown in FIG. 1. Multi-valued image data from image input equipment 301 such as a scanner or digital camera and multi-valued image data stored in various kinds of memory mediums such as a hard disc are inputted to an image input unit 302. The image input unit 302 is a host computer connected to an outside and transfers image information to be printed to an image output unit 303. As for the form of the host computer, a computer as an information processing device is used and in addition to it, an image reader may be used. A reception buffer 309 is an area for temporarily storing data from the image input unit 302 and accumulates the reception data until the reception data are read out from a system controller 305. Inside the system controller 305, a ROM for storing control programs, dot patterns and mask patterns, a RAM as a work area in executing various kinds of image processing, including a microprocessor are arranged. The dot pattern is a pattern for generating binary data from multi-valued data, and the mask pattern is a pattern for determining a print dot in each scan in a multi-path print. A detail of these patterns will be explained later. An image processing unit 310 is configured by the image input unit 302, the reception buffer 304, the system controller 305 and the like. The image processing unit 310 executes image processing for generating binary output data for ejecting plural kinds of ink and a treatment liquid by each print scan, based upon the multi-valued image data from the image input equipment 301. In a case where the image input unit 302 serves as the host computer, the image processing may be executed to be shared with the image input unit 302 and the system controller 305 or by the system controller 305 alone.

The system controller 305 also controls a carriage motor 307 for driving the carriage 11 in a main scan direction and a carriage motor 308 for conveying the printing medium in a sub scan direction through a motor control unit 306. A print control unit 309 controls an operation of the print head 22 to eject plural kinds of ink and a treatment liquid, thus printing an image on the printing medium 1

(Image Processing Unit)

Figure 5:
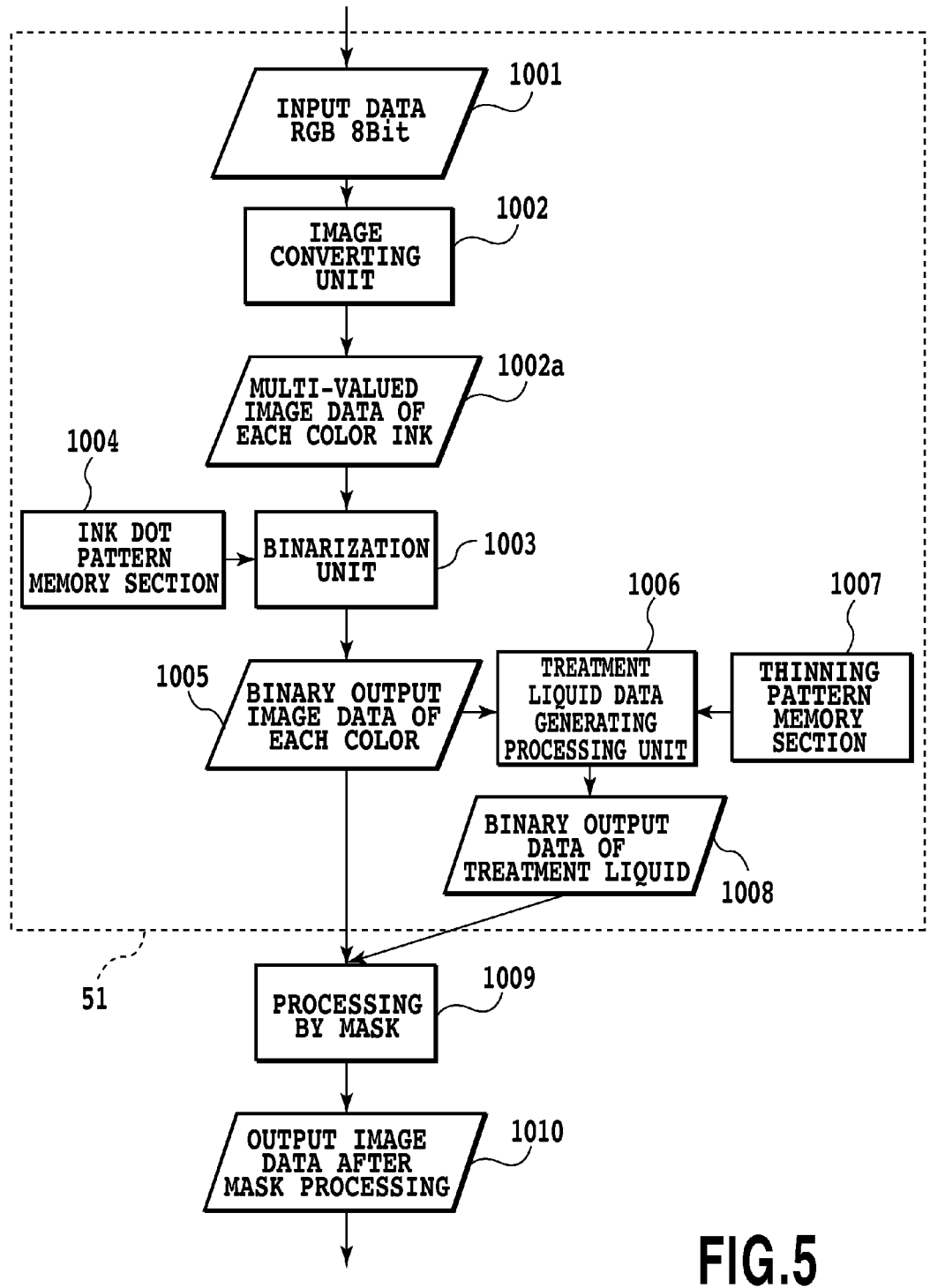
FIG. 5 is a block diagram showing image processing steps at an image processing unit 310.

FIG. 5 is a block diagram showing image processing steps at the image processing unit 310. A rectangular frame shows each image processing step, and a parallelogram shows data. Image converting means 1002 performs luminance density conversion and makes correction by color processing to input data 1001 having luminance information of RGB (red, green and blue) received from the image input equipment 301 or the like. Further, the image converting means 1002 converts the corrected multi-valued image data 1002a of each color into a multi-valued image data corresponding to each of the plural kinds of ink, that is, black (K), cyan (C), magenta (M), yellow (Y), light cyan (LC) and light magenta (LM). The multi-valued image data 1002a is the data of eight bits having a gradation level corresponding to the order of 256 gradations, for example, and in the present embodiment, the data at this stage has resolution of 600 dpi.

The multi-valued image data is quantized into a gradation value of "N" value by quantization means (not shown). A method of the quantization may be executed using general multi-valued error dispersion processing or the like. The N value is determined by a relation between input resolution and output resolution. For example, when the input resolution is 600 dpi and the output resolution is 1200 dpi, dots of the output data form one block with four dots of 2×2 to the input image data having one pixel of eight bits. The gradation number capable of expressing with the one block becomes five values. Therefore, a quantization unit 21 outputs quantization values quantized as five values of "0", "64", "128", "192" and "255". The respective quantization values correspond to the gradation values of "0", "1", "2", "3" and "4".

As for the quantized image data of each color, binarization unit 1003 selects a dot pattern used for output from plural dot patterns corresponding to each gradation value based upon the quantized gradation value from dot pattern memory section 1004. In addition, the binarization unit 1003 outputs a binary output image data 1005 of each color based upon the selected dot pattern. The dot pattern stored in the dot pattern memory section 1004 for ink has a pattern having a dot size of 2×2 for each gradation value when the input resolution is 600 dpi and the output resolution is 1200 dpi. It should be noted that the dot pattern memory section 1004 is provided in a semiconductor memory such as an EEPROM.

The binary output image data 1005 of each color is sent to treatment liquid data generating unit 1006 to generate a binary output data 1008 for treatment liquid from the binary output image data of each color ink. A method of generating the binary output data 1008 of the treatment liquid is a method of generating a binary output data in such a manner as to apply the treatment liquid uniformly to pixels to which ink is applied. In addition, the other method includes a method of changing a treatment amount of the treatment liquid corresponding to properties of the ink kind to be printed to generate the binary output data 1008 for the treatment liquid. An actual treatment method executes logical addition processing to the binary output image data of each color by logical addition unit (OR unit). Further, logical multiplication processing (AND processing) of the processed data and a thinning pattern printed in thinning pattern printing means 1007 is executed to generate the binary output data 1008 for the treatment liquid. The thinning pattern is a pattern for reducing dot numbers printing the treatment liquid in a predetermined ratio. The binary output data 1008 for the treatment liquid can be selected corresponding to compatibility between the plural kinds of ink and the treatment liquid as needed. Based upon the binary output image data of each color and the binary treatment liquid output data, mask processing unit 1009 executes the mask processing by the mask pattern to produce output image data (ejection data for ink and ejection data for treatment liquid) 1110.

Figures 6A, 6B:
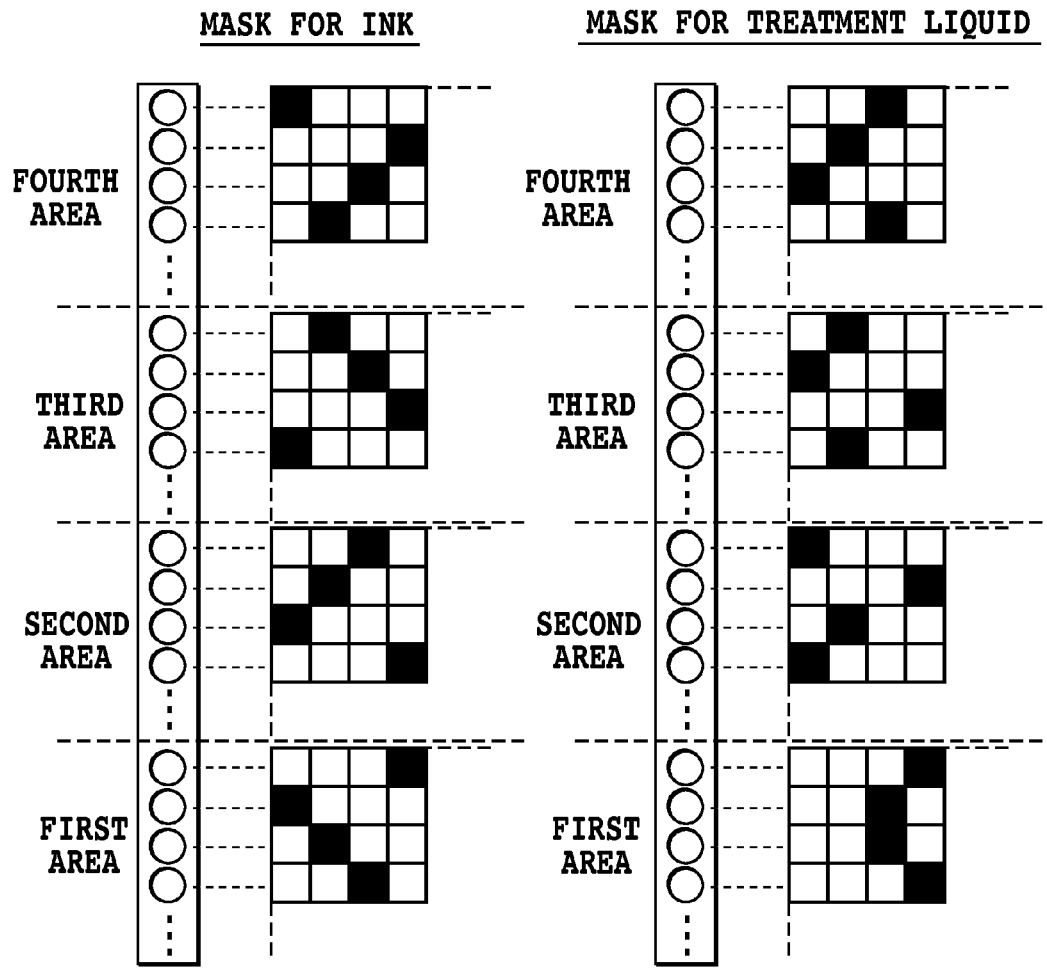
FIGS. 6A and 6B are pattern diagrams showing mask patterns used in the image processing unit.

By referring to FIGS. 6A and 6B, the mask processing using the mask pattern will be specially explained. Here, for simplification of an explanation, there are illustrated the mask patterns for the print head for ink of one color and the print head of the treatment liquid, but the mask pattern may be set for each print head of each color. The mask pattern is stored in a ROM in the system controller 305, and is used to generate a dot data for ejecting the ink of each color and the treatment liquid from the print head 22, for each print scan. It should be noted that the image processing unit 310 constitutes the ejection data generating unit for generating an ejection data instructing whether or not each ink and the treatment liquid are ejected from the print head.

FIGS. 6A and 6B are pattern diagrams showing an example of mask patterns used at the time of performing a multi-path print of four paths in which plural times (here, four times) of scans are performed on the same area to complete an image in the same area. FIG. 6A shows the mask patterns for ink and FIG. 6B shows the mask patterns for treatment liquid. Here, the pixel number of each of the mask pattern for ink and the mask pattern for treatment liquid in a longitudinal direction (sub scan direction) is the same as the number of the nozzles in each print head, and one pixel corresponds to one nozzle. In addition, the pixel number of each mask pattern in a lateral direction may be set as needed. In the multi-path print of four paths, the nozzle line is divided into four areas and the nozzles contained in each area can print dots in print allowance pixels (black area sections) of the mask pattern corresponding to each area. Further, four kinds of the mask patterns corresponding to first area to fourth area are complementary to each other. Therefore, in a case where print data are data as many as to elect the ink or the treatment liquid on an entire pixel area corresponding to the mask pattern, the pixels in the entire pixel area corresponding to the mask pattern can be filled with the ink or the treatment liquid by four times of scans. By finding a logical multiplication of these patterns and the binary output image data 909 at each print scan, the pixels for printing by ink or treatment liquid at each print scan are determined.

As shown in FIGS. 6A and 6B, in a case where in the mask pattern of plural kinds of ink and a treatment liquid corresponding to each scan, black area sections are arranged at random and a thinning rate of each mask pattern is uniform, the ink and the treatment liquid are supposed to be applied to the printing medium randomly at each scan. Therefore, the application order of the plural kinds of ink and the treatment liquid differs depending on the pixel. That is, there are generated the pixel on which the treatment liquid is first applied and thereafter the ink is applied thereon and the pixel on which the ink is first applied and thereafter the treatment liquid is applied thereon, so that the overlapping order of the plural kinds of the ink and the treatment liquid differs depending on the pixel.

For stabilizing an image-quality improving effect of the treatment liquid to the ink, it is preferable that the overlapping order of the plural kinds of the ink and the treatment liquid is uniform in all the pixels. In the print heads 22 shown in FIG. 3, the nozzle lines corresponding respectively to the plural kinds of the ink and the treatment liquid are arranged in parallel, each having the same length (width) in a sub scan direction (carriage direction of the printing medium). In such print heads 22, the application order of the plural kinds of the ink and the treatment liquid on the pixel can be controlled by making the arrangement of the black area sections differ between the ink and the treatment liquid, enabling the overlapping order of the ink and the treatment liquid to be uniform.

Figures 7A, 7B:
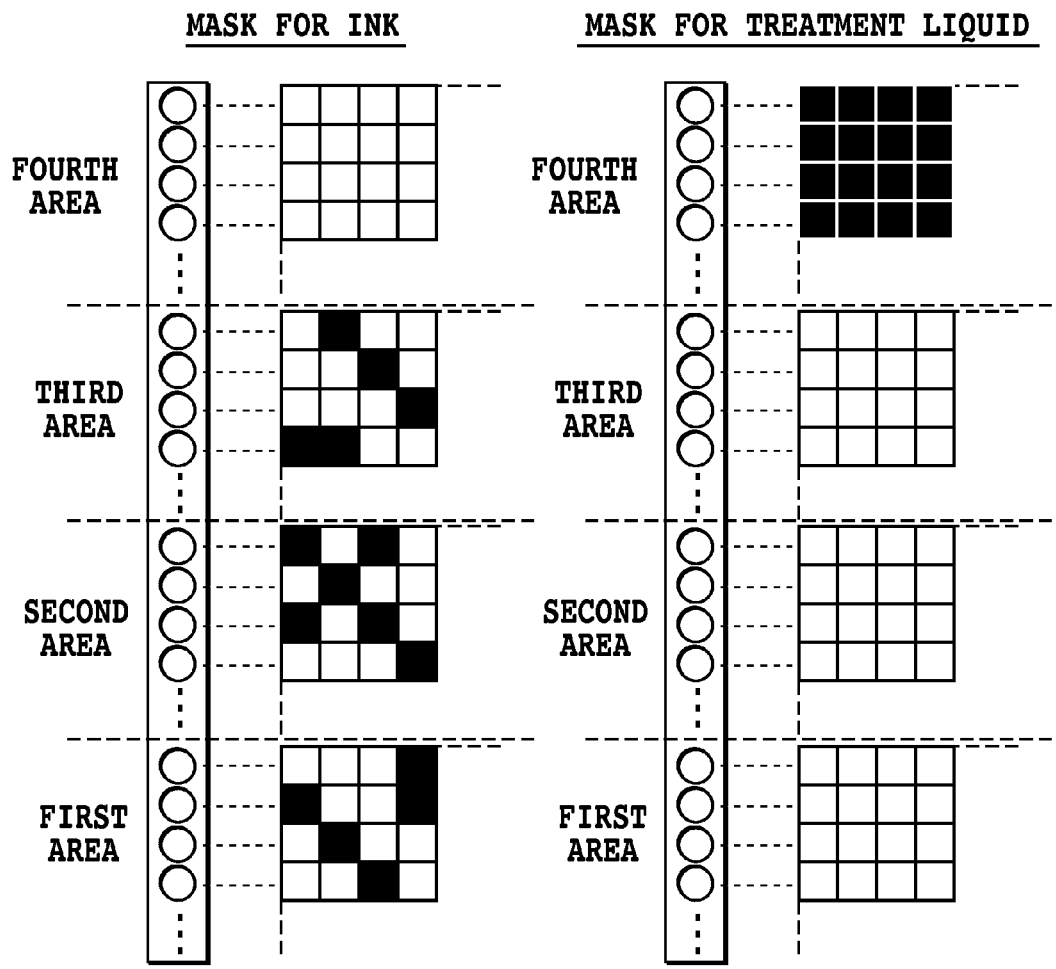
FIGS. 7A and 7B are pattern diagrams showing mask patterns in a case of applying a treatment liquid after completing application of ink.

FIGS. 7A and 7B show mask patterns in a case where a treatment liquid is applied after an application of ink is completed. FIGS. 7A and 7B show the mask patterns for performing a multi-path print of four paths similarly to FIGS. 6A and 6B. It should be noted that FIGS. 7A and 7B also show the mask patterns of the print head corresponding to ink of one color and the mask patterns of the print head for the treatment liquid similarly to FIGS. 6A and 6B. As shown in FIG. 7A, the mask patterns for the ink are patterns in which only nozzles corresponding to the first area to the third area are used and nozzles corresponding to the fourth area are not used. Therefore, the print operation is completed from the first scan to the third scan. It should be noted that since the mask pattern corresponding to the fourth scan is empty (since the black area does not exist), the print is not performed in the fourth scan.

On the other hand, the mask patterns for the treatment liquid are patterns in which nozzles from the first area to the third area are not used and only nozzles in the fourth area are used. Therefore, the mask patterns for the treatment liquid are patterns in which the print of the treatment liquid is not performed from the first scan to the third scan and is performed in the fourth scan alone. In addition, in a case where the treatment liquid is applied before the image formation by ink is made, the mask pattern for the treatment liquid may be made to a pattern in which the treatment liquid is ejected only in the first scan and the mask patterns for the ink may be made to patterns in which the ink is ejected in the second scan to the fourth scan.

In this way, by changing the arrangement of the print allowance pixels (black area sections) in the mask pattern of each of the ink and the treatment liquid, the overlapping order of the ink and the treatment liquid can be uniform.

(Print Operation)

An example of a print operation in the inkjet printing apparatus will be explained with reference to FIGS. 1 and 2. Plural printing mediums 1 stacked in the cassette 15 are fed to a print operation area one by one. In addition, in the print operation area, the printing medium 1 is conveyed between the print head 22 and a platen (not shown) by a pair of carriage rollers 3. On the other hand, the print head 22 ejects the ink and the treatment liquid in accordance with the output image data after the mask processing while moving in an arrow B1 direction (outward direction) in FIG. 1 to print an image on the printing medium 1. This print is performed by applying droplets of the ink and the treatment liquid on the printing medium in the order of black, cyan, magenta, yellow, light cyan, light magenta and the treatment liquid. In addition, when the print corresponding to one scan is completed, in a case of a one-way print, the print head 22 returns back to a home position together with the carriage 11, and the print in the arrow B1 direction is again performed in the order of black, cyan, magenta, yellow, light cyan, light magenta and the treatment liquid. In addition, in a case of a both-way print, the print head 22 performs a print operation similarly to the one-way print while moving in the arrow B1 direction from the home position, and thereafter, also during a period where the print head 22 moves in an arrow B2 direction toward the home position, the print head 22 ejects the treatment liquid and the ink for printing. In the print operation performed at the time the print head 22 moves in the arrow B2 direction, the ink and the treatment liquid are ejected in the order of treatment liquid, light magenta, light cyan, yellow, magenta, cyan and black.

In any of the one-way print and the both-way print, before one time of the print operation (one scan) is completed and the next print operation starts, a pair of carriage rollers 3 are driven for conveying the print medium by a predetermined amount in an arrow A direction. By thus repeating the print operation corresponding to one time of the scan and the predetermined amount of the conveyance operation of the printing medium, the print is performed on the print medium a predetermined width by a predetermined width.

In the present embodiment, not only the one-way print mode where the application order of the ink and the treatment liquid is always constant but also the both-way print mode where the application order of the ink and the treatment liquid is reversed for each scan are executable and the effect to be described later can be obtained in both of the print modes.

(Change in Image Robustness due to Contact of Ink and Treatment Liquid)

The featuring configuration in the present invention is in a point where at the time of making an image formation using plural kinds of ink in which a degree of a change in image characteristic by contact with the treatment liquid differs and the treatment liquid, the application order of the plural kinds of the ink to an area in which the treatment liquid is in contact with the ink is controlled corresponding to the kind of the ink.

Hereinafter, as for the change of the image characteristic, by taking a change in the image robustness due to contact between the pigment ink and the treatment liquid as an example, the effectiveness in regard to controlling the application order of plural kinds of ink will be explained.

Figure 8A:
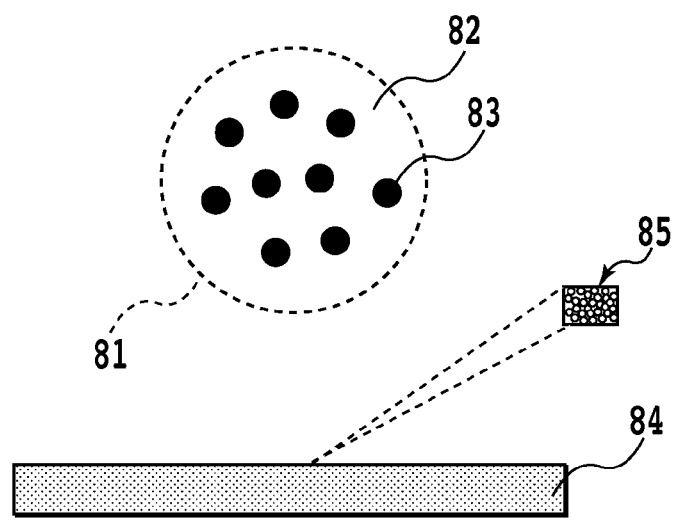
FIG. 8A is a pattern diagram showing a state before a pigment ink dot is firmly fixed on a glossy paper.
Figure 8B:
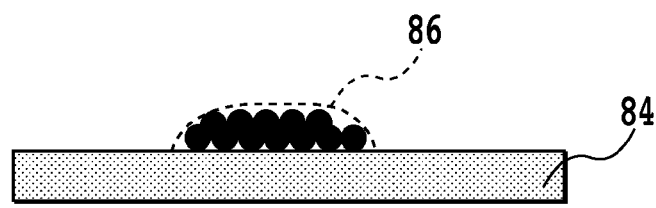
FIG. 8B is a pattern diagram showing a fixing state after the pigment ink dot is firmly fixed on the glossy paper.

FIGS. 8A and 8b are pattern diagrams each showing a state where an ink dot 81 is firmly fixed on a surface of a glossy paper in a case of performing an image formation using pigment ink on the glossy paper. As shown in FIG. 8A, each of color material pigment particles 83 existing in a state of being dispersed in a solvent component 82 of the pigment ink is larger in size than each of fine bores 85 of inorganic fine particles forming an ink acceptable layer 84 existing on the surface of the glossy paper. Therefore, the color material pigment particles 83 are separated from the solvent component 82 on a surface of the ink acceptable layer 84, and a pigment ink layer 86 is formed on the surface of the ink acceptable layer 84 by the color material pigment particles 83 which have remained on the surface of the ink acceptable layer 84 as shown in FIG. 8B.

As a result, when the image surface is in contact with a friction object, a force is applied directly on the pigment ink layer 86 formed by the color material pigment particles 83. Therefore, a scratch tends to be easily produced on the image surface, frequently raising a problem of image peeling or the like. There are some cases where in an actual use environment, in the handling process of rolling up or putting on a wall a printing medium, a damage of an image at the contacting with a nail or the like is remarkably large and the image completely falls off.

As for a measure for reducing damages of an image such as image peeling, it is effective to coat the surface of the pigment ink layer 86 with a transparent plastic layer 87. That is, since the transparent plastic layer 87 prevents the nail or the like from being in direct contact with the pigment ink layer 86, the damage of the image can be reduced. Particularly since the transparent plastic layer having a low friction coefficient reduces the force to be applied on the surface of the image at the contacting with a friction object, the damage of the image can be largely reduced.

As shown in FIG. 9A, a state where the surface of the pigment ink layer 86 is coated with the transparent plastic layer 87 can be formed by ejecting the treatment liquid containing a transparent plastic component above the pigment ink dot formed by landing the pigment ink on the surface of the ink acceptable layer 84. In addition, in a case of improving image robustness by coating the pigment ink layer 86 with the transparent plastic layer 87, it is the most effective to substantially completely coat the surface of the pigment ink layer 86 with the transparent plastic layer 87. Here, a ratio of the coating of the transparent plastic layer to the image surface formed by the pigment ink is defined as a coating percentage. It is desirable that the coating percentage in consideration of a practical use level is 50% or more, preferably 70% or more.

Here, the inventors have found that a treatment amount of the treatment liquid required for obtaining the above coating percentage differs depending greatly on the kind of pigment ink. It is considered that this is because a mutual function between the pigment ink and the treatment liquid at the contacting thereof differs depending on the kind of the ink. That is, a spread characteristic or a residual characteristic of the treatment liquid dot on the ink layer surface differs depending on the kind of the ink, which is considered to be a factor causing a difference in treatment amount of the treatment liquid required for obtaining a constant coating percentage.

FIGS. 9B and 9C are pattern diagrams each showing a layer structure at the time of forming a transparent plastic layer on each surface of first pigment ink 101 and second pigment ink 102 by a treatment liquid. On the surface of the first pigment ink 101, a transparent plastic layer 87 gets thin because of good wetting of a treatment liquid dot and a coating area per one dot of the treatment liquid is large (spread of the dot is large). On the other hand, on the surface of the second pigment ink 102, the transparent plastic layer 87 gets thick because of poor wetting of the treatment liquid dot and a coating area per one dot of the treatment liquid is small (spread of the dot is small). A mechanism that the spread characteristic of the treatment liquid dot changes depending on the kind of the pigment ink is considered to be caused by a magnitude relation between surface energy of the pigment ink layer and surface energy of the treatment liquid at the contacting of the pigment ink and the treatment liquid. In a case where the surface energy of the pigment ink layer is larger than that of the treatment liquid at the contacting of both, the wetting spread of the treatment liquid becomes larger and in reverse, in a case where the surface energy of the pigment ink layer is smaller, the wetting spread of the treatment liquid becomes smaller. In this way, a change of the surface energy of the pigment ink layer caused by the kind of the ink is considered to be influenced by an event that a pigment color material used for ink, a dispersion plastic used at dispersion, an additional plastic for adjusting characteristics of the pigment ink layer and the like differ depending on the kind of the ink.

Figure 10B:
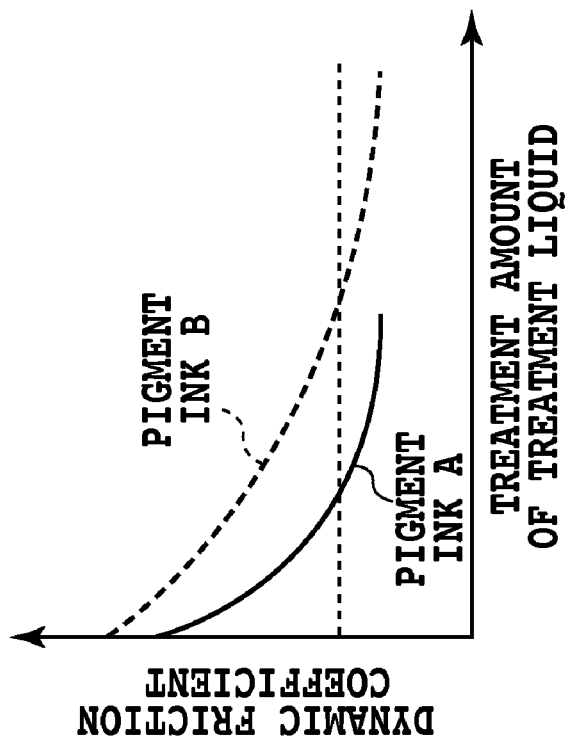
FIG. 10B is a diagram showing a change in friction coefficient by a treatment amount of a treatment liquid.
Figure 10A:
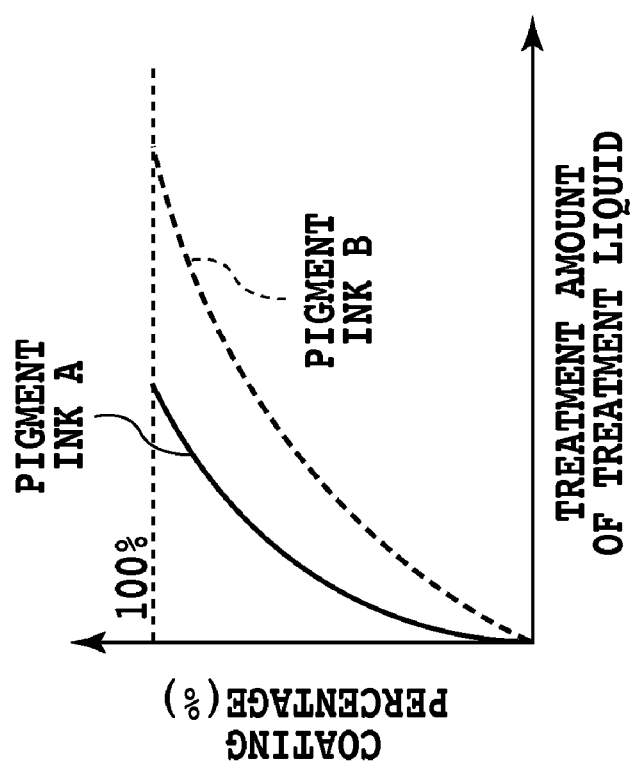
FIG. 10A is a diagram showing a change of a coating percentage by a treatment amount of a treatment liquid.

FIGS. 10A and 10B are diagrams showing a difference in changes of a coating percentage and a dynamic friction coefficient to a treatment amount of a treatment liquid between different kinds of the first and second pigment ink 101 and 102 in a case of forming a transparent plastic layer by applying a treatment liquid containing a transparent plastic component having sliding properties on an image surface thereof to the first and second pigment ink 101 and 102. In the first pigment ink 101, the spread of the dot of the contacted treatment liquid is larger than in the second pigment ink 102. Therefore, an application amount of the treatment liquid required for obtaining the identical coating percentage between both of the first pigment ink 101 and the second pigment ink 102 is smaller in the first pigment ink 101 than in the second pigment ink 102. In addition, in regard to a change in the dynamic friction coefficient also, in the first pigment ink 101, the spread of the dot of the contacted treatment liquid is larger than that in the second pigment ink 102. Therefore, a reduction amount of the dynamic friction coefficient relative to an application amount of the treatment liquid is larger in the first pigment ink 101 than in the second pigment ink 102. That is, the application amount of the treatment liquid required for reducing the dynamic friction coefficient to less than a constant value may be made smaller in the first pigment ink than in the second pigment ink.

Next, by referring to FIGS. 11A and 11B, there will be explained a case where the first pigment ink 101 and the second pigment ink 102 overlap to be printed and a surface thereof is processed by a treatment liquid.

Figures 11A, 11B:
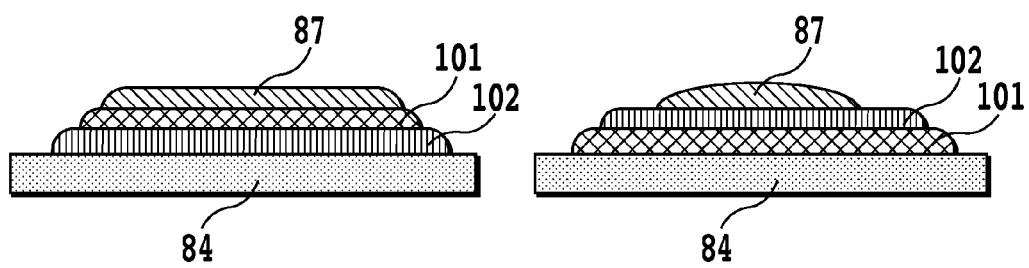
FIGS. 11A and 11B are pattern diagrams each showing a state firmly fixed by applying a treatment liquid on where plural kinds of ink is applied to overlap.

FIG. 11A is a pattern diagram showing a state where the first pigment ink 101 on which the treatment liquid spreads a large distance is applied after the second pigment ink 102 is applied, and the treatment liquid is applied on the surface of the first pigment ink 101 to form the transparent plastic layer 87 thereon. On the other hand, FIG. 11B is a pattern diagram showing a state where the second pigment ink 102 on which the treatment liquid 87 spreads only a small distance is applied after the first pigment ink 101 is applied, and the treatment liquid is applied on the surface of the second pigment ink 102 to form the transparent plastic layer 87 thereon.

In a state shown in FIG. 11A, the treatment liquid is in direct contact with the dot formed by the first ink and in a state shown in FIG. 11B, the treatment liquid is in direct contact with the dot formed by the second ink. On this occasion, in a case where an application amount of the treatment liquid is the same between the state shown in FIG. 11A and the state shown in FIG. 11B, a coating percentage of the treatment liquid to the ink dot is higher in the state shown in FIG. 11B than in the state shown in FIG. 11A. Therefore, in the state shown in FIG. 11B, the effect (image robustness) by the treatment liquid similar to that in the state in FIG. 11A can not be obtained if an application amount of the treatment liquid is not further increased as compared to that in the state shown in FIG. 11A.

As in the case of the conventional multi-path printing method, in a case of applying the treatment liquid without controlling the application order of the plural kinds of ink, a pixel in which the ink is applied in the order as shown in FIG. 11A and a pixel in which the ink is applied in the order as shown in FIG. 11B result in existing randomly.

In the present embodiment, in a case where plural kinds of ink each having a different coating characteristic of the treatment liquid is applied to overlap, by controlling, as described later, the application order of the plural kinds of the ink before applying the treatment liquid, the image characteristic similar to that of the conventional can be obtained even if a consumption amount of the treatment liquid is reduced.

(Configuration of Ink)

A specific configuration of each of the ink and the treatment liquid in the present embodiment is shown as follows. Here, pigment ink is used as the ink, and the treatment liquid is a treatment liquid of improving image robustness by forming a coating layer having a sliding characteristic on the surface of the pigment ink layer as described above by being in contact with the pigment ink.

(Cyan Ink)
Production of Dispersion Liquid

An AB block polymer having an acid value of 250 and a number average molecular weight of 3000 was produced using benzylacrylate and methacrylic acid as materials by a common procedure, which was further neutralized with potassium hydroxide solution, and diluted with ion exchanged water to form uniform polymer solution of 50 mass %. 180 g of the polymer solution, 100 g of C. I. pigment blue 15:3, and 220 g of ion exchanged water were mixed, and the mixture was mechanically stirred for 0.5 hours. Next, the mixture was repeatedly put in a mutual function chamber by five times under about 70 MPa of a liquid pressure for processing by using a micro-fluidizer. Further, the above obtained dispersion liquid was subjected to centrifugal separation processing (12000 rpm for 20 minutes) to remove non-dispersion objects containing coarse particles form a cyan dispersion liquid. The obtained cyan dispersion liquid had pigment density of 10 mass % and dispersant density of 10 mass %.

Production of Ink

Production of ink was made as follows. The above cyan dispersion liquid was used, and the following components were added to the cyan dispersion liquid to form predetermined density. After these components were sufficiently mixed and stirred, the mixture was pressurized and filtered by a micro filter having a pore size of 2.5 μm (made by Fuji Film Co., Ltd.) to prepare pigment ink having pigment density of 2 mass % and dispersant density of 2 mass %.

| | |
|---|---|
| The above cyan dispersion liquid | 20 parts |
| glycerin | 10 parts |
| diethylene glycol | 10 parts |
| Acetylene glycol EO adduct (made by Kawaken Fine Chemicals Co., Ltd.) | 0.5 parts |
| Ion-exchanged water | the rest |

(Light Cyan Ink)

Production of light cyan ink was made in the same way with the cyan ink using the above cyan dispersion liquid except that the following components were blended in the following weight ratio.

| | |
|---|---|
| The above cyan dispersion liquid | 4 parts |
| glycerin | 10 parts |
| diethylene glycol | 10 parts |
| Acetylene glycol EO adduct (made by Kawaken Fine Chemicals Co., Ltd.) | 0.5 parts |
| Ion-exchanged water | the rest |

(Magenta Ink)
Production of Dispersion Liquid

C. I. pigment red 122 was used as pigment and a magenta dispersion liquid having pigment density of 10 mass % and dispersant density of 5 mass % was obtained by the production unit similar to that of the dispersion liquid of the cyan ink.

Production of Ink

Production of ink was made as follows. The above magenta dispersion liquid was used, and the following components were added to the magenta dispersion liquid to form predetermined density. After these components were sufficiently mixed and stirred, the mixture was pressurized and filtered by a micro filter having a pore size of 2.5 μm (made by Fuji Film Co., Ltd.) to prepare pigment ink having pigment density of 4 mass % and dispersant density of 2 mass %.

| | |
|---|---|
| The above magenta dispersion liquid | 40 parts |
| glycerin | 10 parts |
| diethylene glycol | 10 parts |
| Acetylene glycol EO adduct (made by Kawaken Fine Chemicals Co., Ltd.) | 0.5 parts |
| Ion-exchanged water | the rest |

(Light Magenta Ink)

Production of light magenta ink was made in the same way with the magenta ink using the above magenta dispersion liquid except that the following components were blended in the following weight ratio.

| | |
|---|---|
| The above magenta dispersion liquid | 8 parts |
| glycerin | 10 parts |
| diethylene glycol | 10 parts |
| Acetylene glycol EO adduct (made by Kawaken Fine Chemicals Co., Ltd.) | 0.5 parts |
| Ion-exchanged water | the rest |

(Yellow Ink)

Production of a dispersion liquid was made as follows.

| | |
|---|---|
| Pigment [C.I. pigment yellow 74 (product name: Hansa Brilliant Yellow 5GX (Clariant Co., jp))] | 10 parts |
| Anionic polymer macro molecule P - 1 [styrene/butylacrylate/copolymer acrylate (copolymer ratio (weight ratio) = 30/40/30), acid value 202, weight average molecular weight 6500, solution of solid content 10%, neutralizing agent: potassium hydroxide] | 30 parts, and |

-continued

| | |
|---|---|
| pure water | 60 parts | were mixed, the following materials were put in a batch type vertical sand mill (made by Aimex Co., jp), 150 parts of zirconia beads having a diameter of 0.3 mm were filled therein and the dispersion processing was executed for 12 hours while water-cooled. Further, this dispersion liquid was put in a centrifugal separator to remove coarse particles. As a final regulatory substance, a yellow dispersant having a solid content of about 12.5% and a weight average particle diameter of 120 nm was obtained. The obtained pigment dispersant was used to prepare ink as follows.

Production of Ink

After the following components were mixed, which were sufficiently stirred to be dissolved and dispersed, the mixed components were pressurized and filtered by a micro filter having a pore size of 1.0 μm (made by Fuji Film Co., Ltd.) to prepare ink.

| | |
|---|---|
| The above pigment dispersant | 40 parts |
| glycerin | 9 parts |
| ethylene glycol | 6 parts |
| acetylene glycol EO ethylene oxide adduct (product name: Ascechinol EH) | 1 part |
| 1,2-hexanediol | 3 parts |
| polyethylene glycol (molecular weight 1000) | 4 parts |
| Ion-exchanged water | the rest |

(Black Ink)

Production of Dispersion Liquid

Carbon black (product name: PrintX 85; Degussa-made) was used as pigment and a black dispersion liquid having pigment density of 10 mass % and dispersant density of 6 mass % was obtained by the production means similar to that of the dispersion liquid of the cyan ink.

Production of Ink

The above black dispersion liquid was used for production of ink, and the following components were added to the black dispersion liquid to form predetermined density. After these components were sufficiently mixed and stirred, the mixed components were pressurized and filtered by a micro filter having a pore size of 2.5 μm to prepare pigment ink having pigment density of 5 mass % and dispersant density of 3 mass %.

| | |
|---|---|
| The above black dispersion liquid | 50 parts |
| glycerin | 10 parts |
| triethylene glycol | 10 parts |
| Acetylene glycol EO adduct (made by Kawaken Fine Chemicals Co., Ltd.) | 0.5 parts |
| Ion-exchanged water | the rest |

(Treatment Liquid)

The following components were mixed and sufficiently stirred to prepare a treatment liquid. An acryl silicon copolymer plastic as a plastic compound having a sliding characteristic was used as a transparent plastic component. Use of this transparent plastic enables a transparent plastic layer having a high sliding characteristic to be formed on a surface of the pigment ink at the contacting with an upper surface of the pigment ink.

| | |
|---|---|
| transparent plastic (plastic solid content conversion) (product name: SYMAC US-450; Toagosei-made) | 5 parts |
| glycerin | 10 parts |
| ethylene glycol | 5 parts |
| polyethylene glycol (molecular weight 1000) | 5 parts |
| acetylene glycol EO adduct (made by Kawaken Fine Chemicals Co., Ltd.) | 0.5 parts |
| Ion-exchanged water | the rest |

(Treatment Amount of Treatment Liquid)

As for the ink produced above, a treatment amount for obtaining image robustness considering a practical use in a case of treating a surface of each ink with the treatment liquid produced above was measured by the following method. It should be noted that the treatment amount of ink means a minimum application amount of the treatment liquid per a predetermined area required for achieving an improvement effect of image characteristics (image robustness in the present embodiment) by the treatment liquid to each ink. Here, the treatment amount of the ink will be a value expressing, in percentage terms, a ratio of the minimum application amount of the treatment liquid required for achieving the improvement effect of the image characteristic in the ink applied over an entire predetermined area to an application amount of the ink at the time of applying the ink over the entire predetermined area.

A single color print duty of pigment ink was set as 150% (print resolution of 1200 dpi) and the treatment liquid produced above was applied on the pigment ink layer surface by changing a print duty thereof 10% by 10% to produce printed objects. A photo glossy paper (made by Canon, product name: GP101R) was used as the printing medium.

A dynamic friction coefficient to a PMMA plastic ball in each printed object obtained above was evaluated using a surface properties tester (product name: Heidon Toraibogia TYPE 14DR; made by Shinto Scientific co., Ltd.). Here, for obtaining image robustness considering a practical use of the printed object, the treatment liquid was applied until the dynamic friction coefficient reached 0.2 or less, and an application amount of the treatment liquid was measured.

In the present embodiment, for producing a scratch close to a damage of an image which can be generated at the contacting with a nail, a polymethylmethacryl acid (PMMA) plastic ball (4 mmφ) was used as a friction member. Table 1 shows the result of applying the treatment liquid until the dynamic friction coefficient of each ink image to the plastic ball reached 0.2 or less.

It should be noted that in this test, a vertical load added to the PMMA plastic ball was set as 50 g, a moving speed thereof was set as 2 mm/sec, a horizontal force exerting in a moving direction of the PMMA plastic ball at moving was measured by a load cell, and a ratio of the horizontal force to the vertical load force was calculated as a dynamic friction coefficient.

In addition, when a coating percentage of the transparent plastic layer in the treatment amount of ink of each color in FIG. 2 was observed by an electronic microscope, each coating percentage was 70% or more in all the kinds of the ink.

TABLE 1

| Ink | Treatment amount [%] |
|---|---|
| Yellow (Y) | 20 |
| Magenta (M) | 40 |
| Light magenta (LM) | 20 |
| Cyan (C) | 40 |
| Light cyan (LC) | 20 |
| Black (K) | 50 |

(Configuration of Image Processing Unit)

The featuring configuration of the present invention is in a point that in a case of performing an image formation by plural kinds of ink each having a different changing degree in image characteristic when the ink gets in contact with a treatment liquid and the treatment liquid, the application order of the plural kinds of the ink in a predetermined area in contact with the treatment liquid is controlled in accordance with the change degree of the image characteristic. That is, in the present embodiment, when the plural kinds of the ink and the treatment liquid are applied in that order, the application order of the plural kinds of the ink is controlled such that the ink on which the treatment liquid tends to easily spread is applied in a later application order (print scan) among the plural kinds of the ink. According to this configuration, the treatment liquid tends to easily spread on the ink dot and it is possible to reduce the application amount of the treatment amount without largely degrading the effect (image robustness) by the treatment liquid.

Here, the predetermined area means an area defined to have a unit pixel as a reference. In addition, the unit pixel expresses a pixel unit of an input image data or a pixel unit of a binary output data as the minimum unit. Therefore, in a case of performing control of the print order in the minimum unit, the predetermined area is the pixel unit of the binary output image data.

The control of the application order of the plural kinds of the ink is performed in the image processing unit. Hereinafter, a specific method of the image processing for performing the control of the print order as the pixel unit of the binary output data which is the minimum unit will be explained with reference to a flow chart in FIG. 12.

Figure 12:
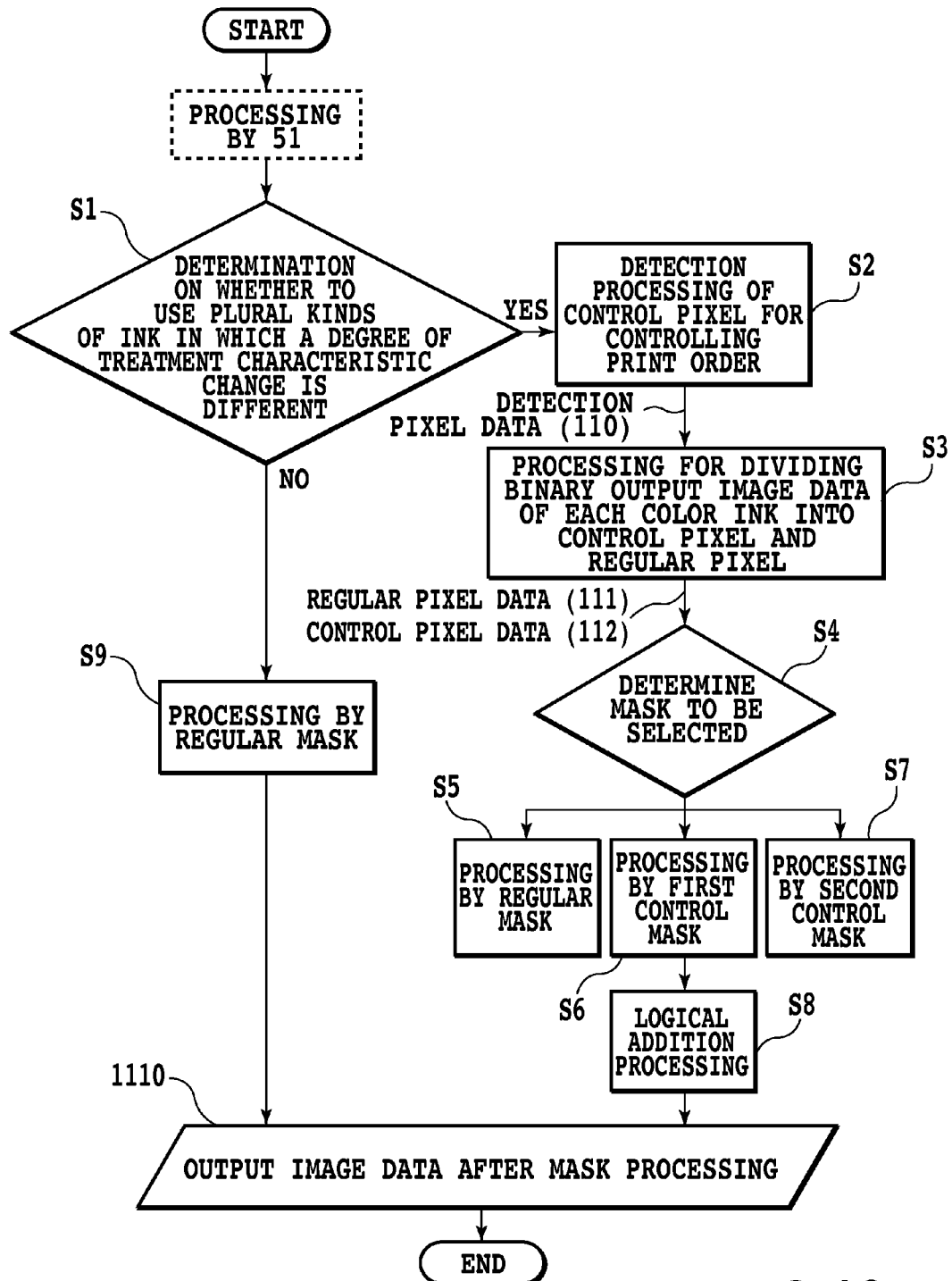
FIG. 12 is a flow chart showing the processing order executed at an image processing unit in a first embodiment.

In FIG. 12, the processing similar to the processing 51 shown in FIG. 5 is executed till a stage of generating the binary output image data 1005 of each color ink and the binary output data 1008 of the treatment liquid. The binary output image data 1005 of each color ink and the binary output data 1008 of the treatment liquid are sent to the system controller 305. Here, the CPU in the system controller 305 determines whether or not plural kinds of ink each having a different changing degree in image characteristic when the ink gets in contact with a treatment liquid is used for image formation, from the binary output image data of each color ink. In the present embodiment, at the time of making the determination, the plural kinds of the ink is, as shown in Table 1, classified into plural groups in accordance with the treatment amount in advance found for each color ink and the determination is made based upon whether or not the image data in different groups are used for the image formation. For example, ink of plural colors is divided into two groups A and B, group A having a small treatment amount and group B having a large treatment amount, wherein group A includes yellow (Y), light magenta (LM) and light cyan (LC), and group B includes magenta (M), cyan (C) and black (K). In addition, it is determined whether or not the image data in different groups are used for image formation, and the control of the print order of each color ink to be described later is performed based upon the result of the determination.

As described above, the plural kinds of the ink can be classified into two or more groups as needed depending on the difference of the treatment amount, but it is possible also to provide a group of ink in which the control of the print order is not performed, considering image degradation or the like due to performing the control of the print order.

Figure 13A:
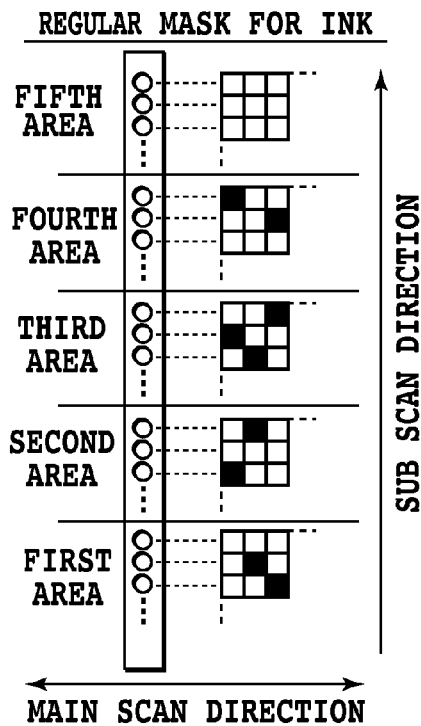
FIGS. 13A to 13D are pattern diagrams showing mask patterns used in a mask processing unit in the first embodiment.
Figure 13B:
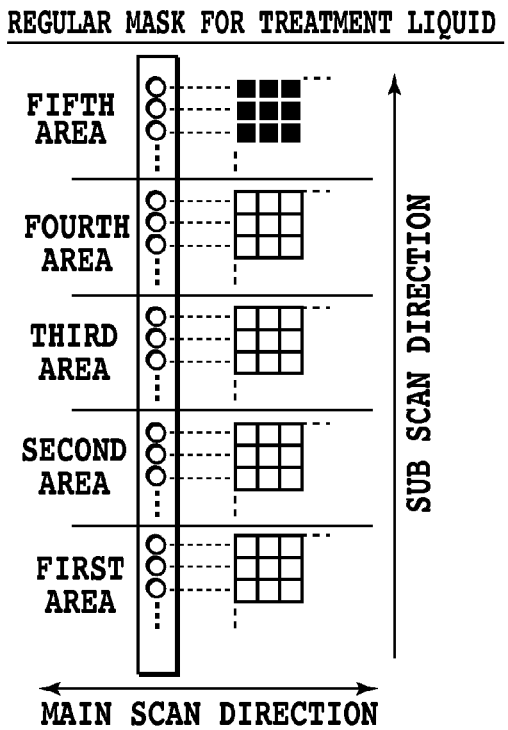

The system controller 305 determines whether or not a data in a group for controlling the print order exists, based upon the binary image data of each group (step S1). In a case where it is determined that the data for controlling the print order does not exist, when it is determined that it is not necessary to perform the control of the print order, the binary output image data 1005 of all the kinds of the ink and the binary output data 1008 of the treatment liquid are processed with the regular mask to generate output image data (step S2). An example of mask patterns used for generating the output image data is shown in FIG. 13A. The mask patterns shown here are mask patterns for completing the image formation by five times of scans. FIGS. 13A and 13B show mask patterns to output image data of ink and output data of a treatment liquid used in a regular print operation.

A print operation by ink is performed by ejecting ink from the print head in four times of scans from the first to fourth scans on each area based upon image data obtained from the data processing using the mask patterns shown in FIG. 13A. An image in one area is completed by the four times of the scans. In addition, an application of the treatment liquid is, as a result of the data processing using the mask patterns in FIG. 13B, not performed in the first scan to the fourth scan and is performed in the fifth scan only. It should be noted that the treatment liquid in the present embodiment is a treatment liquid for coating a transparent plastic layer on a surface of the pigment ink.

On the other hand, in a case where at step S1 it is determined that the control of the print order should be performed, that is, in a case where it is determined that binary output image data in different groups exist, the control of the print order as follows is performed at step S2 to step S8.

First, at step S2, there is made detection of a pixel for controlling the application order of ink out of pixels for applying plural kinds of ink belonging to different groups, based upon the binary output image data 1005 of each ink and the binary output data 1008 of the treatment liquid. It should be noted that in the following explanation, the pixel for controlling the application order of ink is called a control pixel and the pixel for not controlling the application order of ink is called a regular pixel. The detection processing of the control pixel is executed all together in a unit of the binary output image data 1005 of the kinds of ink belonging to the same group. By processing the data to be all together detected in a group unit, the detection of the control pixel can be largely shortened. In the detection processing, OR processing of the binary data is first executed in each group to find a sum data of each group. Next, a logical multiplication of the sum data of each group and the binary output data of the treatment liquid is found. Therefore, a detection pixel data 110 can be detected.

Here, when the group is classified into two or more groups, for example, three groups A, B and C, the similar detection processing is executed in the respective groups. As a result, among pixels in which plural kinds of ink in the groups A, B and C overlaps, the following four kinds of control pixels are detected as the control pixels. That is, a control pixel ABC in which plural kinds of ink belonging to the groups A, B and C overlaps, a control pixel AB in which plural kinds of ink belonging to the groups A and B overlaps, a control pixel BC in which plural kinds of ink belonging to the groups B and C overlaps and a control pixel CA in which plural kinds of ink belonging to the groups C and A overlaps are detected.

For the detection of the control pixel, it is possible to set additional conditions in addition to the overlap condition between groups and the overlap condition of the treatment liquid as described above. For example, there may be used a thinning mask in which ink print density per unit pixel (hereinafter, described as print duty) is calculated based upon an ink multi-value data 1002 of each color and the control pixel is thinned in accordance with the print duty. This is because the effect of controlling the print order is reduced in the pixel having a low print duty since an overlapping degree between ink dots is lower. In addition, considering an actual use condition of the image, since the effect by the treatment liquid is achieved even if the coating percentage by the treatment liquid is not perfect, it is possible to apply a mask for thinning the control pixels at a predetermined ratio.

Next, at step S3, the binary output image data of each color is divided into the regular pixel 111 and the control pixel 112 based upon the control pixel data detected at step S2. In regard to the division method, for example, a logical multiplication of the binary output pixel data and the control pixel of each color ink is found to detect the control pixel data 112 of each color ink, and thereafter, the regular pixel data 111 are detected by logical differential processing of the binary output pixel data and the control pixel data.

Next, at step S4, selection of the mask pattern processing is made for thinning the divided binary output data of the each color ink, and thereafter, the thinning processing of the binary output data is executed based upon the selected mask pattern (steps S5 to S7).

Figure 13C:
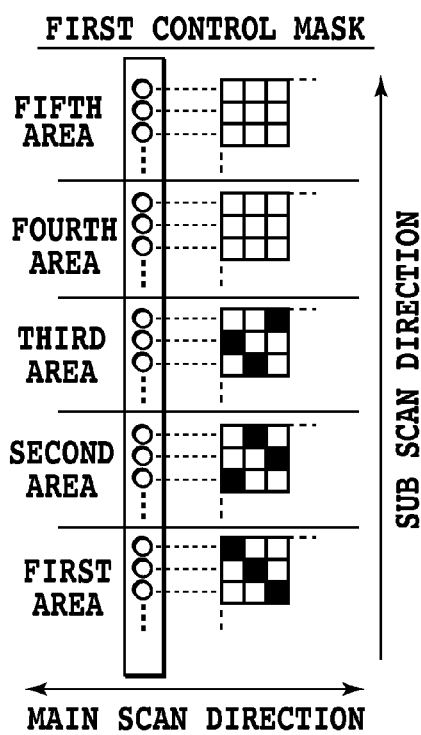
Figure 13D:
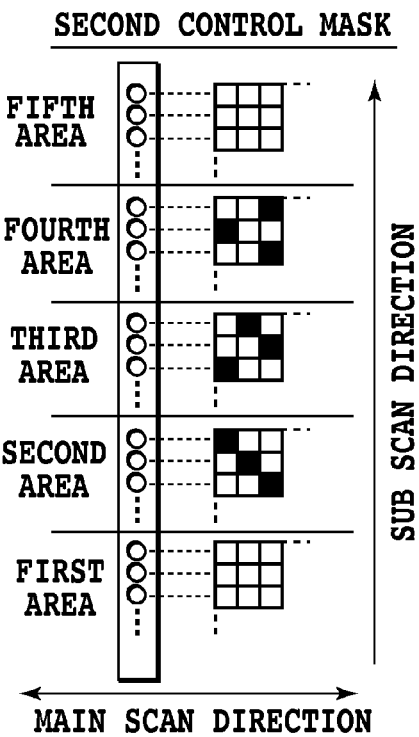

FIGS. 13A to 13D show examples of mask patterns of ink and a treatment liquid. FIGS. 13A, 13C and 13D are mask patterns of the binary output image data of the ink, and FIG. 13B is a mask pattern used for the binary output data of the treatment liquid. FIG. 13A is mask patterns used for regular mask processing performed to the regular pixel data 111. In addition, FIGS. 13C and 13D show mask patterns used for first control mask processing and second control mask processing and these mask patterns are used for the control pixel data 112. In addition, a print (ink ejection) from a first scan to a third scan is performed based upon the binary output image data of the ink subjected to the first control mask processing by the mask patterns shown in FIG. 13C. In addition, a print (ink ejection) from a second scan to a fourth scan is performed based upon the binary output image data of the ink subjected to the second control mask processing by the mask patterns shown in FIG. 13D. Here, a mask pattern in a first area in FIG. 13C is the same pattern as that in a second area in FIG. 13D. Likewise, a mask pattern in a second area in FIG. 13C is the same pattern as that in a third area in FIG. 13D and a mask pattern in a third area in FIG. 13C is the same pattern as that in a fourth area in FIG. 13D. In consequence, in the print operations based upon the data processed by the first control mask and the second control mask, the print operation by the data processed by the first control mask is performed with priority and thereafter, the print operation by the data processed by the second control mask is performed. Therefore, by allotting the control pixel data of each ink into the first control mask processing and the second control mask processing, the application order of the ink to each control pixel can be controlled in a pixel unit.

Table 2 shows a relation between each data and the mask processing unit. In the present embodiment, an application of ink belonging to group A having a low treatment amount is controlled to be performed by a scan following a scan for performing an application of ink belonging to group B having a large treatment amount. Therefore, the control pixel data for applying the ink belonging to group A is processed by the first control mask and the control pixel data for applying the ink belonging to group B is processed by the second control mask. In addition, the regular pixel data for applying each color ink is processed by the regular mask.

TABLE 2

|  | Regular pixel data | Control pixel data |
| --- | --- | --- |
| Group A ink (Y, LM, and LC) | Regular mask processing | First control mask processing |
| Group B ink (M, C and K) | Regular mask processing | Second control mask processing |

Here, the mask patterns of the first control mask processing and the second control mask processing are not limited to the above relation in Table 2, and the mask pattern may have a pattern arrangement where the print order in the control pixel is controlled in the first control mask processing and the second control mask processing. For example, the binary output image data subjected to the first control mask processing may be set as data only corresponding to the first area and the second area, and the binary output image data subjected to the second control mask processing may be set as data only corresponding to the third area and the fourth area.

After the print pixel dot in each scan is determined by the above mask processing, the logical addition processing is executed (step S8). In consequence, the image data subjected to the regular mask processing and the image data subjected to the control mask processing for each color ink are combined to generate output image data 1110 of each color ink and the treatment liquid after the mask processing. An image formation is made based upon these output image data.

Therefore, according to the present embodiment, by controlling the application order of plural kinds of ink such that the ink on which the treatment liquid tends to easily spread has a later application order (print scan) among the plural kinds of the ink, the treatment liquid tends to easily spread on the ink dot, making it possible to reduce the application amount of the treatment liquid.

(Production of Printed Object)

The pigment ink produced as described above and the treatment liquid containing a transparent plastic having sliding properties were used to produce a printed object as shown below.

The input image data were produced such that the print duty of cyan was 100% and the print duty of light cyan was 50%. In addition, a print duty of the reaction liquid was set as 25%. A one-way print was performed by five times of scans, wherein the image characteristic was evaluated in a case of controlling the ink application order by the above image processing method and in a case of not controlling the ink application order. As shown in the result of Table 3, it was found out that a scratch resistance of an image of a printed object was more excellent in a case of controlling the ink application order than in a case of not controlling the ink application order.

TABLE 3

| Image | Control of ink application order between groups A and B | Scratch resistance |
|---|---|---|
| Group A (light cyan: 50%) Group B (cyan 100%) Treatment liquid: 40% | Presence<br>Absence | High<br>Low |

According to the image processing of the present embodiment, since it is possible to control the application order of the plural kinds of the ink on the pixel as the minimum unit of the image formation based upon the binary output data, the application order of the plural kinds of the ink between the different groups can be controlled in the ink dot unit.

2. Second Embodiment

Next, a second embodiment of the present invention will be explained.

In the present embodiment, the control of the application order of plural kinds of ink in the image processing unit will be performed based upon multi-valued data and explained with reference to a flowchart in FIG. 14. Resolution of an input image data is set as 600 dpi and resolution of an output image data is set as 1200 dpi. In addition, generation of a binary output data 10005 of each color ink and a binary output data 10008 of a treatment liquid can be made in the same way with the above-mentioned first embodiment. Further, also in the present embodiment, group A having a small treatment amount includes yellow (Y), light magenta (LM) and light cyan (LC), group B having a large treatment amount includes magenta (M), cyan (C) and black (K), and the treatment liquid is applied after completing an application of the ink.

The second embodiment differs in a point of executing mask selection parameter calculating processing S11 in FIG. 19 from the first embodiment, and hereinafter, this different point will be explained. The mask selection parameter calculating processing 150 detects pixels for controlling the application order of plural kinds of ink having different image characteristics in a case where the treatment liquid is applied thereon, in an input pixel unit, and also calculates a mask allotment parameter to be selected and a mask changing flag according to the following calculating processing.

Figure 15:
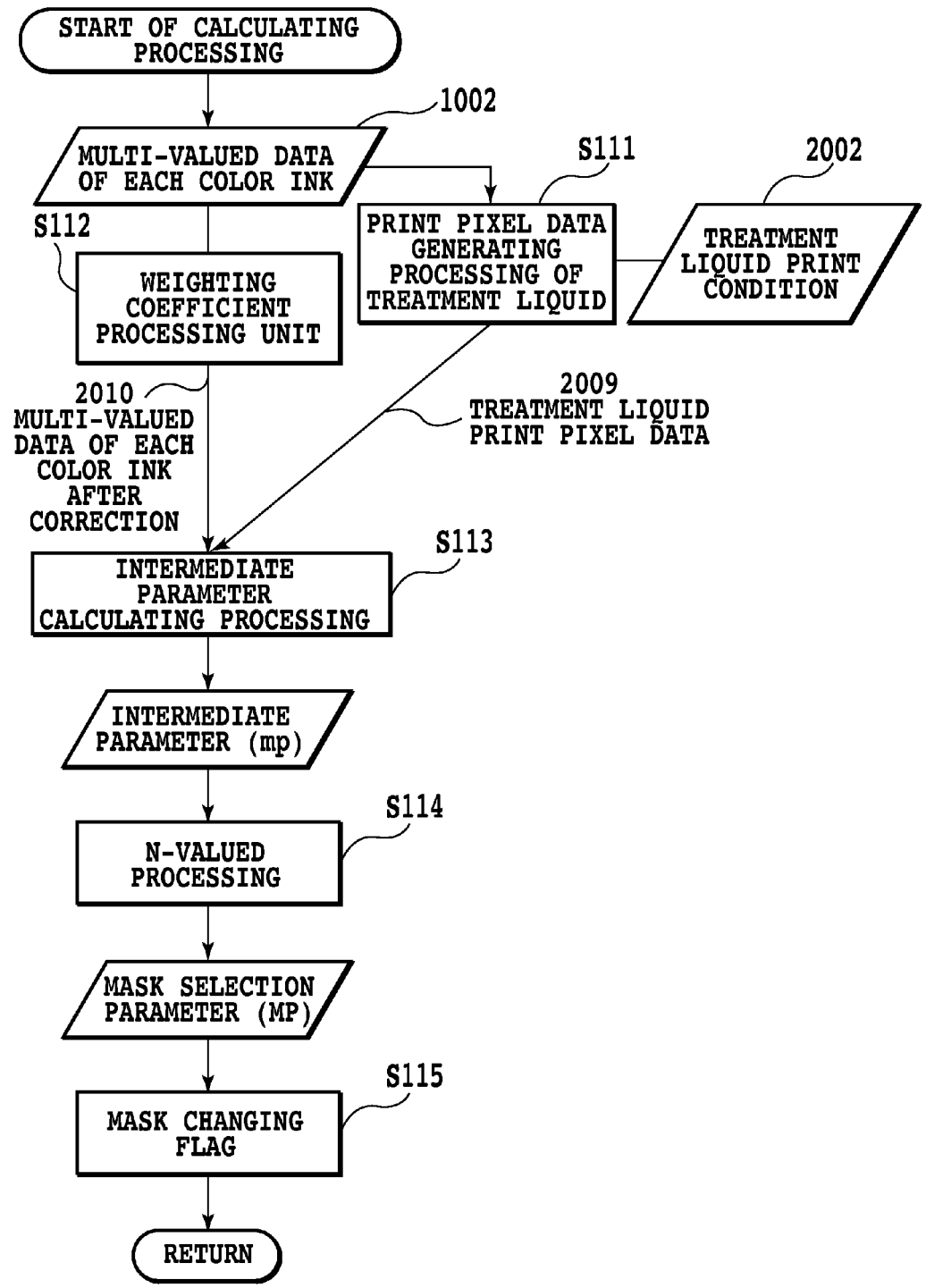
FIG. 15 is a flow chart showing mask selection parameter calculating processing in FIG. 14.

FIG. 15 shows a flow chart of the mask selection parameter calculating processing 150.

A treatment liquid application pixel data 2009 is generated according to a treatment liquid application condition stored in memory section based upon a multi-valued data 1002 of each color ink. The treatment liquid application pixel data 2009 is a binary data defining whether or not the treatment liquid is printed in an image unit of the multi-valued data 1002. The treatment liquid application condition can be set based upon the multi-valued data 1002 of each color ink as needed. For example, there is a method where a treatment liquid application threshold value X is set and a value of the multi-valued data 1002 of each color ink is compared with X to determine a print pixel or a method where a multi-valued data of a specific ink kind is compared with the treatment liquid application value X to determine the print pixel.

In addition, in weighting coefficient processing unit, a weighting coefficient (zero to one value) is multiplied to the multi-valued data 1002 of each color ink to generate a multi-valued data 2010 of each color ink after correction. The weighting coefficient herein indicates an influence degree in mask selection for each ink and may be determined in an arbitrary way. The reason for setting the weighting coefficient is that there are some cases where even if plural kinds of ink belongs to the same group, in a case where the plural kinds of ink is mixed, each kind of the ink has a slightly different magnitude of the influence degree on the image characteristic when the treatment liquid of each kind of the ink is applied. For example, when each of multi-valued data values (eight bits: 0 to 255) of different kinds of ink Y, LM and LC constituting group A is set as Y=64, LM=64 and LC=64, a ratio of influence degrees of the respective kinds of the ink to a sum of group A is not a relation of 1:1:1 and can slightly change. In this case, an influence balance between the respective kinds of the ink can be appropriately adjusted by multiplying the multi-valued data by the weighting coefficient.

The calculating processing 2004 performs a calculation of an intermediate parameter mp indicating an overlapping degree between plural kinds of ink in different groups to a pixel on which a treatment liquid is applied, based upon the corrected multi-valued data 2010 of each color ink and the treatment liquid print pixel data 2009 (step S113). In regard to this calculation, in each group classified corresponding to the treatment amount, a logical addition of the corrected multi-valued data 2010 of each color ink constituting the each group is first calculated. Here, the logical addition of the plural kinds of the ink belonging to group A is defined as a and the logical addition of the plural kinds of the ink belonging to group B is defined as β. Next, a logical multiplication of α, β and the binary treatment liquid print pixel data 2009 is calculated, a value of which is defined as mp. Here, in a case where mp is not zero, a logical multiplication of α and β is calculated, which is assigned in mp. Therefore, to a pixel in which plural kinds of ink overlaps between different ink groups having different treatment amounts in a pixel unit of an input image and further the treatment liquid is printed, a value other than zero is assigned in mp according to the overlapping degree between the different ink groups. Table 3 shows a relation of the intermediate parameter to the corrected multi-valued data 2010 of each color ink and the treatment liquid pixel data 2009.

TABLE 4

| Corrected multi-data of each color ink | Treatment liquid pixel data | α | β | Intermediate parameter Mp |
|---|---|---|---|---|
| Y = 32,<br>LM = 64,<br>LC = 128,<br>C = 20, M = 64,<br>K = 0 | 1 | 224 | 84 | 308 |
| Y = 10,<br>LM = 32,<br>LC = 64,<br>C = 92, M = 64,<br>K = 0 | 1 | 106 | 156 | 262 |
| Y = 32, LM = 0,<br>LC = 32,<br>C = 32, M = 32,<br>K = 128 | 0 | 64 | 192 | 0 |

*multi-valued data (eight bits): 0 to 255 (0: no application of ink, 255: maximum ink application amount)

As an example shown in the top in Table 4, for example, in a case where Y=32, LM=64, LC=128 in group A and C=20, M=64, K=0 in group B, a logical addition α of group A is equal to 229 and a logical addition β of group B is equal to 84. Further, since a logical multiplication of α, β and the binary treatment liquid print pixel data [1] is 1, a logical addition 308 of α and β is assigned in mp. In addition, as an example shown in the bottom in Table 4, in a case where Y=32, LM=0, LC=69, C=32, M=32, K=128, α, =64 and β=192, but since the binary treatment liquid print pixel data is "0", the intermediate parameter mp is "0".

Next, N-valued processing 2006 is executed to the intermediate parameter mp to generate a N-valued mask selection parameter MP (step S114). The N-valued method can be carried out using a general error dispersion process, a dither matrix process or the like. Here, a threshold value at the N-valued processing is set considering a magnitude of the intermediate parameter mp and an effect by controlling the application order of plural kinds of ink, that is, an improvement effect in image characteristics of the treatment liquid. This is because when the intermediate parameter mp is small, the print duty per pixel unit is small, and therefore the improvement effect in the image characteristics of the treatment liquid by controlling the print order is reduced to be small.

Here, MP is a parameter for selecting a mask. In a case where N=2, MP of each pixel includes two kinds of values "0" and "1". The pixel of MP=0 is a pixel where the application order of plural kinds of ink is not controlled in group A and group B, and the pixel of MP=1 is a pixel where the application order of the plural kinds of the ink is controlled corresponding to the treatment characteristic of the treatment liquid. A value of N can increase corresponding to the mask number for controlling the application order of the plural kinds of the ink. That is, as the print duty in a pixel unit is higher, the effect for controlling the application order of the plural kinds of the ink enhances. Therefore, a difference in a control degree of the application order of the plural kinds of the ink can be made by setting N to three or more. For example, when N=3, the pixel of MP=0 is a pixel where the application order of the plural kinds of the ink is not controlled in group A and group B, and the pixel of MP=1 is a pixel where the application order of the plural kinds of the ink is completely controlled. Further, the pixel of MP=2 is a pixel where the application order of the plural kinds of the ink is controlled in group A and group B by 50% of the entirety. In this way, it is possible to set the degree of controlling the application order of the plural kinds of the ink to three or more steps in accordance with the print duty in a pixel unit.

Next, at step S115, a mask changing flag 2008 is found based upon a value of the mask selection parameter MP. The mask changing flag 2008 is a binary parameter for determining whether or not selection of the mask processing is made at determination processing S12 in FIG. 14. In a case where control of the application order of the plural kinds of the ink between groups to all the pixels is not performed, that is, in a case where a value of MP is 0, the mask changing flag is "0", and in a case where the value of MP includes a value other than 0, the mask changing flag is "1".

Hereinafter, the procedure of generating the output image data 1010 by executing the mask processing to the binary output image data 1005 of each color ink and the binary output data 1008 of the treatment liquid generated in the same way with the first embodiment will be explained with reference to FIG. 14.

Figure 14:
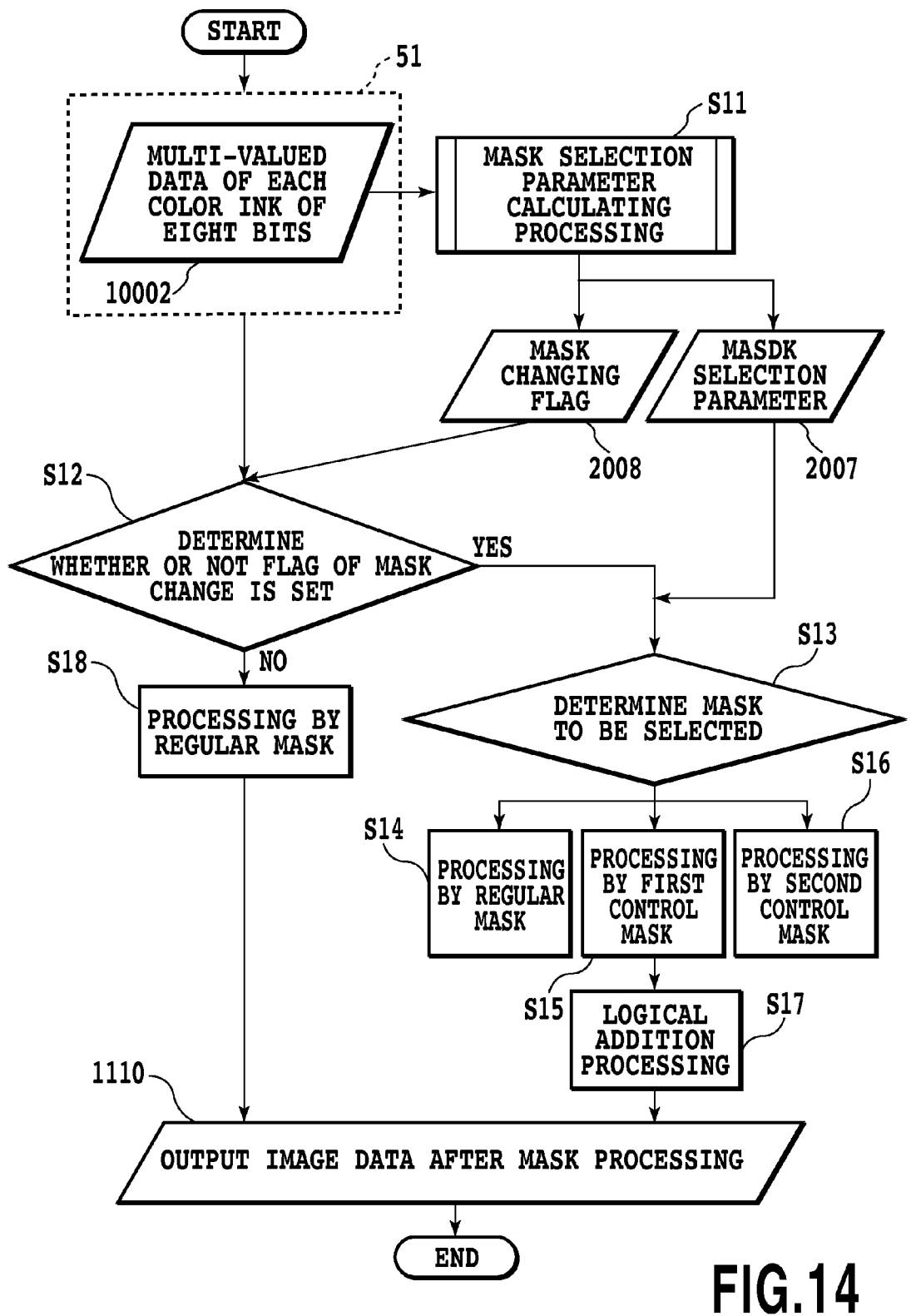
FIG. 14 is a flowchart showing the processing order executed at an image processing unit in a second embodiment of the present invention.

In the determination processing (step S12) shown in FIG. 14, the subsequent direction of the image processing is determined by referring to a value of the mask changing flag 2008. That is, at step S12 it is determined whether or not the above-mentioned mask changing flag is set (whether or not the mask changing flag is "1"). Here, in a case where the mask changing flag is "0", the binary output image data 1005 of all the kinds of the ink and the binary output data 1008 of the treatment liquid are processed by the regular mask (step S18) to generate the output image data for each print scan 1110. The mask patterns of the processing by the regular mask may use the mask patterns shown in FIGS. 13A and 13B similarly to the first embodiment.

On the other hand, when it is determined that the mask changing flag is "1" in the determination processing at step S12, there is carried out selection of the mask pattern for executing the mask processing to the binary output image data 1005 of the ink of each group controlling the print order. That is, the binary output image data 1005 of the ink of each group controlling the print order and the binary output data 1008 of the treatment liquid are processed by the regular mask (step S14) to generate an output image data. In addition, in regard to the binary output image data 1005 of the ink for controlling the application order, the processing by the first control mask and the processing by the second control mask are selected to generate the output image data.

Here, the second embodiment differs from the first embodiment in a point where the detection processing S2 and the division processing S3 executed in the first embodiment are not necessary and the mask selection is carried out directly at determining processing S13. This is because detection of the pixel for performing the control of the print order in a multi-valued image data unit is already made by the above mask selection parameter 2007. In determining processing S13 for selecting the mask, the mask selection is made in an image resolution unit of the multi-valued image data based upon the mask selection parameter 2007.

FIGS. 16A to 16C show an example of mask patterns in a multi-valued image data unit in the mask processing (steps S14 to S16). Since a pixel unit of the multi-valued image data is 600 dpi and an output image data is 1200 dpi, one pixel of the multi-valued image data is divided into four sections. FIG. 16A shows patterns of regular mask processing S14 in which the control of the print order is not performed. Since the application of the ink is made in the first scan to the fourth scan, a mask pattern in a fifth area is empty. In addition, FIG. 16A shows a pattern arrangement in which an application of the ink is made uniformly from the first scan to the fourth scan in the pixel unit of 600 dpi in the multi-valued image data. FIGS. 16B and 16C show patterns of a first control mask and a second control mask in which the application order of the plural kinds of the ink is controlled.

The patterns of the first control mask shown in FIG. 16B are patterns used from the first scan to the third scan and the patterns of the second control mask shown in FIG. 16C are patterns used from the second scan to the fourth scan. Here, the pattern in a first area of FIG. 16B is the same as the pattern in a second area shown in FIG. 16C, and likewise the pattern in a second area of FIG. 16B is the same as the pattern in a third area shown in FIG. 16C. Further, the pattern in a third area of FIG. 16B is the same as the pattern in a fourth area shown in FIG. 16C. In consequence, the print operation by the image data processed by the first control mask is performed with priority and thereafter, the print operation by the image data processed by the second control mask is performed. Therefore, by allotting the binary output image data 1005 into the first control mask and the second control mask in the multi-valued image data unit by the mask parameter 2007, the application order of the plural kinds of the ink can be controlled in a pixel unit.

Table 5 shows a corresponding relation of the mask selection parameter 2007 to the mask processing of each group in the second embodiment. In the present embodiment, group A having a low treatment amount is controlled to be printed by a scan following a scan for group B having a large treatment amount. Therefore, the binary output image data 1005 to a pixel of MP=1 is processed by the first control mask (step S15) and the binary output image data 1005 to a pixel of MP=1 in group B is processed by the second control mask (step S16). In addition, a pixel of MP=0 is processed by a regular mask (step S14).

TABLE 5

|  | Pixel of MP = 0 | Pixel of MP = 1 |
| --- | --- | --- |
| Group A ink (Y, LM, and LC) | Regular mask processing | Second control mask processing |
| Group B ink (M, C and K) | Regular mask processing | First control mask processing |

In regard to the binary output data of each color ink subjected to the mask processing in the above corresponding relation, logical addition processing is executed for each ink (step S17) to generate an output image data 1010 for each print scan.

In the above-mentioned, there is explained a case where the mask selection parameter 2007 is a binary value (N=2), but by setting N to three or more, the control of the print order can be more accurately performed. As mentioned before, in a case of N=3, it is possible to use a pattern where the control of the application order of the plural kinds of the ink is performed by a ratio of 50% of the entirety in regard to a pixel of MP=2. This can be possible by a mask pattern printing the half of the unit pixels in the same scan.

According to the feature in the present embodiment, since the control of the print order is performed in the input pixel unit, the print can be performed at a high speed as compared to the image processing in the minimum pixel unit for performing a print as in the case of the first embodiment. In addition, the present embodiment also has an advantage that the control of the application order of the plural kinds of the ink can be performed in more divided steps, for example, in such a manner that an overlapping degree of ink dots in a pixel unit can be changed by setting the mask selection parameter.

3. Other Embodiments

In each of the above-mentioned embodiments, there is explained an example where the liquid for increasing the image robustness is used as the treatment liquid, but it is possible to use a liquid for increasing image quality such as glossy properties or coloring properties of an image or a liquid for increasing both of the image robustness and the image quality as the treatment liquid. For example, by contacting with the ink, it is possible to use a liquid increasing a scratch resistance of an image and also showing coagulation reaction with ink.

In addition, in each of the above-mentioned embodiments, the first control mask pattern and the second control mask pattern are the patterns where a relation of the print allowance pixels is a mutual relation. That is, for example, the pattern in the first area of the first control mask pattern is the same as the mask pattern in the second area of the second control mask pattern, and likewise the pattern in the second area of the first control mask pattern is the same as the mask pattern in the third area of the second control mask pattern. Therefore, the ink belonging to the group having a small treatment amount subjected to the first control mask processing is securely ejected at a later print operation (print scan) than the ink belonging to the group having a larger treatment amount subjected to the second control mask processing. However, even if the print allowance pixels of the first control mask pattern and the second control mask pattern are defined without any relation with each other, for example, the first control mask pattern is defined as a mask pattern ejecting ink in the first area to the third area. In addition, the second control mask pattern is defined as a mask pattern ejecting ink in the first area to the third area. In this case, since there is a higher possibility that the ink belonging to the group having a small treatment amount subjected to the first control mask processing is ejected at a later print operation (print scan) than the ink belonging to the group having a larger treatment amount subjected to the second control mask processing, the effect of the present invention can be achieved.

In each of the above-mentioned embodiments, in addition to the ink used for the image formation, the treatment liquid for increasing characteristics of the image (image robustness such as scratch resistance in the above-mentioned embodiment) by the ink is separately used. Since the treatment liquid is applied to be in contact with ink and is applied mainly on the ink, it is preferable that the treatment liquid is basically in a state close to being colorless and transparent. However, even if the treatment liquid is colored, a material increasing a function such as a scratch resistance is added to a part of or all of kinds of the pigment ink of light color among the plural kinds of the pigment ink used for the image formation, such as light cyan ink, light magenta ink and light gray ink, which may have both functions of the image formation and the image improving characteristic. In this case, since additional components, such as the ink tank and the print head, corresponding to one color become unnecessary, this case contributes greatly to downsizing or low costs of the apparatus. In addition, depending on an image formed, a part of or all of kinds of pigment ink of thick color among the kinds of the pigment ink used for the image formation may serve as the treatment liquid.

In addition, the treatment liquid may be ejected on a print medium before performing the image formation to exist under the pigment ink image layer, and further may be ejected together with the pigment ink in the middle of performing the image formation to exist inside the pigment ink image layer. In addition, after completing the image formation, the treatment liquid may be ejected on the printing medium to exist on the outermost surface (surface positioned at the outermost side) of the pigment ink image layer. In this way, the present invention is not limited to the application order of the treatment liquid and the pigment ink or the existing position of the treatment liquid.

In addition, the present invention can be applied to all of the printing apparatuses using a print medium such as paper, fabric, non-woven fabric or OHP film. Examples of specific application apparatuses can include office equipment such as a printer, copier and facsimile machine or a mass production machine.

In addition, in the above-mentioned embodiment, there is explained the configuration where the image processing unit 29 for executing the featuring processing of the present invention is disposed inside the inkjet printing apparatus, but the present invention is not limited to the configuration where the image processing unit 29 is disposed inside the inkjet printing apparatus. For example, as shown in FIG. 12, a printer driver of the host computer connected to the inkjet printing apparatus may carry out a function of the image processing unit 29. In this case, the printer driver generates ejection data for ink and ejection data for treatment liquid based upon the multi-valued image data received from the application, which will be supplied to the printing apparatus 301. In this way, the inkjet printing system configured to include the host computer and the inkjet printing apparatus 301 is also in the scope of the present invention. In this case, the host computer serves as a data supplying apparatus for supplying data to the inkjet printing apparatus and serves also as a controlling apparatus for controlling the inkjet printing apparatus.

The feature of the present invention is in a point of data processing executed at the image processing unit 29. Accordingly, a data generating apparatus equipped with the image printing unit 29 for executing the featuring data processing of the present invention is also in the scope of the present invention. In a case where the image printing unit 29 is equipped in the inkjet printing apparatus, this inkjet printing apparatus serves as the data generating apparatus of the present invention. In addition, in a case where the image processing unit 29 is equipped in the host computer, this host computer serves as the data generating apparatus of the present invention.

Further, a computer program for executing the above-mentioned featuring data processing by a computer or a printing medium for storing the program to be readable by a computer is also in the scope of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-150073, filed Jun. 24, 2009, which is hereby incorporated by reference herein in its entirety.

What is claimed is:

1. An inkjet printing apparatus, comprising:
a print head that scans a same area of a printing medium plural times and ejects plural kinds of ink and a treatment liquid thereon to form an image; and
an ejection data generating unit for generating ejection data for ejecting the plural kinds of ink and the treatment liquid to each predetermined area of the printing medium in a predetermined order from the print head,
wherein the plural kinds of ink are classified in plurality based upon a minimum application amount of the treatment liquid per a predetermined area required for realizing an effect of the treatment liquid, and the ejection data generating unit generates the ejection data in such a manner as to eject the plural kinds of ink and the treatment liquid from the print head according to the order determined in accordance with the classification of the ink ejected within the predetermined area.

2. An inkjet printing apparatus according to claim 1, wherein the ejection data generating unit, in such a manner that at the time of applying the plural kinds of ink different in classifications on a pixel within the predetermined area for overlapping, the ink belonging to the classification where the minimum application amount is the smallest is applied after the ink belonging to other classifications is applied and the treatment liquid is applied after the ink where the minimum application amount is the smallest is applied, generates ejection data for ink for ejecting the ink and ejection data for treatment liquid for ejecting the treatment liquid.

3. An inkjet printing apparatus according to claim 1, wherein the ejection data generating unit includes a determining unit for detecting pixels on which the treatment liquid is applied out of the respective pixels within the predetermined area and determining the classification of the ink applied on each of the detected pixels,
wherein in the pixel on which the treatment liquid is applied and the plural kinds of ink different in the classification are determined to be applied, the ejection data for the ink are controlled so that the ink belonging to the classification where the minimum application amount is the smallest is applied after the ink belonging to other classifications is applied.

4. An inkjet printing apparatus according to claim 3, wherein the ejection data generating unit includes:
a data converting unit for converting an inputted multi-valued image data into an ejection data for ink corresponding to each of the plural kinds of ink; and
a determining unit for detecting pixels on which the treatment liquid is applied out of the respective pixels within the predetermined area and determining the classification of the ink applied on each of the detected pixels based upon the ejection data for each kind of ink.

5. An inkjet printing apparatus according to claim 3, wherein the ejection data generating unit includes a determining unit for detecting pixels on which the treatment liquid is applied out of the respective pixels within the predetermined area and determining the classification of the ink applied on each of the detected pixels based upon an inputted multi-valued image data or an image data generated in the process of generating the ejection data.

6. An inkjet printing apparatus according to claim 1, wherein the treatment liquid includes an image characteristic-improving liquid for improving a characteristic of the image printed on the printing medium, by contacting with the ink applied on the printing medium.

7. An inkjet printing apparatus according to claim 1, wherein the treatment liquid improves an image characteristic of at least one of image robustness and image quality by contacting with the ink applied on the printing medium.

8. An inkjet printing apparatus according to claim 1, wherein the treatment liquid improves image robustness formed by the ink by coating the ink applied on the printing medium therewith.

9. An inkjet printing apparatus according to claim 1, wherein the treatment liquid increases density of the image by reacting with the ink applied on the printing medium.

10. An inkjet printing apparatus according to claim 1, wherein the predetermined area includes any of a single pixel, a plurality of pixels, and an area printable by a one-time scan of the print head.

11. An inkjet printing apparatus according to claim 1, wherein the treatment liquid includes a colorless liquid.

12. An inkjet printing apparatus according to claim 1, wherein the treatment liquid includes a colored liquid.

13. An inkjet printing apparatus according to claim 1, wherein the plural kinds of ink includes pigment ink.

14. An inkjet printing method in which a print head scans the same area of a printing medium by plural times and ejects plural kinds of ink and a treatment liquid to form an image, comprising:
an ejection data generating step for generating ejection data for ejecting the plural kinds of ink and the treatment liquid to each predetermined area of the printing medium in a predetermined order from the print head,
wherein the plural kinds of ink are classified in plurality based upon a minimum application amount of the treatment liquid per a predetermined area required for realizing an effect of the treatment liquid, and the ejection data generating step generates the ejection data in such a manner as to eject the plural kinds of ink and the treatment liquid from the print head according to the order determined in accordance with the classification of the ink ejected within the predetermined area.

15. A data generating apparatus generating ejection data for ink for forming an image by scanning the same area of a printing medium plural times by a print head and ejecting plural kinds of ink and a treatment liquid from the print head, comprising:

an ejection data generating unit for generating ejection data for ejecting the plural kinds of ink and the treatment liquid to each predetermined area of the printing medium in a predetermined order from the print head, wherein the plural kinds of ink are classified in plurality based upon a minimum application amount of the treatment liquid per a predetermined area required for realizing an effect of the treatment liquid, and the ejection data generating unit generates the ejection data in such a manner as to eject the plural kinds of ink and the treatment liquid from the print head according to the order determined in accordance with the classification of the ink ejected within the predetermined area.

16. An inkjet printing system, comprising:

an inkjet printing apparatus in which a print head scans a same area of a printing medium plural times and ejects plural kinds of ink and a treatment liquid to form an image; and a data supplying apparatus for supplying data for printing the image to the inkjet printing apparatus, wherein the data supplying apparatus comprises:

an ejection data generating unit for generating ejection data for ejecting the plural kinds of ink and the treatment liquid to each predetermined area of the printing medium in a predetermined order from the print head; and a supplying unit for supplying the ejection data of the treatment liquid generated by the ejection data generating unit to the inkjet printing apparatus, wherein the plural kinds of ink are classified in plurality based upon a minimum application amount of the treatment liquid per a predetermined area required for realizing an effect of the treatment liquid, and the ejection data generating unit generates the ejection data in such a manner as to eject the plural kinds of ink and the treatment liquid from the print head according to the order determined in accordance with the classification of the ink ejected within the predetermined area.

17. A non-transitory computer readable medium containing a program for executing the ejection data generating step according to claim 14 using a computer.

* * * * *